United States Patent
Xue et al.

(10) Patent No.: US 11,724,248 B2
(45) Date of Patent: Aug. 15, 2023

(54) SELECTIVE CATALYTIC REDUCTION ARTICLES AND SYSTEMS

(71) Applicant: BASF Corporation, Florham Park, NJ (US)

(72) Inventors: Wen-Mei Xue, Dayton, NJ (US); Xiaofan Yang, Westfield, NJ (US); Haiyang Zhu, Edison, NJ (US); Stanley Roth, Yardley, PA (US); Jeff Yang, Glen Rock, NJ (US); Subramanian Prasad, Edison, NJ (US); Ahmad Moini, Princeton, NJ (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 17/206,963

(22) Filed: Mar. 19, 2021

(65) Prior Publication Data
US 2021/0229079 A1    Jul. 29, 2021

Related U.S. Application Data

(63) Continuation of application No. 16/495,574, filed as application No. PCT/IB2018/051874 on Mar. 20, 2018, now abandoned.
(Continued)

(51) Int. Cl.
*B01J 29/04* (2006.01)
*B01D 53/94* (2006.01)
(Continued)

(52) U.S. Cl.
CPC ........ *B01J 29/044* (2013.01); *B01D 53/9418* (2013.01); *B01D 53/9468* (2013.01);
(Continued)

(58) Field of Classification Search
None
See application file for complete search history.

(56) References Cited

U.S. PATENT DOCUMENTS 3,434,062 A    3/1969    Cox
5,254,515 A    10/1993   Imai
(Continued)

FOREIGN PATENT DOCUMENTS

| EP | 0093477 | * | 4/1983 |
| GB | 2543600 A | | 4/2017 |
| GB | 2543601 A | | 4/2017 |

OTHER PUBLICATIONS

Luo, Jinyong et al. "Impact of Accelerated Hydrothermal Aging . . . ". AEI International. vol. 8, Issue 3. 2015 (Year: 2015).*
(Continued)

*Primary Examiner* — Sheng H Davis
(74) *Attorney, Agent, or Firm* — DLA Piper LLP (US)

(57) ABSTRACT

The present disclosure relates to copper-containing molecular sieve catalysts that are highly suitable for the treatment of exhaust containing NOx pollutants. The copper-containing molecular sieve catalysts contain ion-exchanged copper as $Cu^{+2}$ and $Cu(OH)^{+1}$, and DRIFT spectroscopy of the catalyst exhibits perturbed T-O-T vibrational peaks corresponding to the $Cu^{+2}$ and $Cu(OH)^{+1}$. In spectra taken of the catalytic materials, a ratio of the $Cu^{+2}$ to the $Cu(OH)^{+1}$ peak integration areas preferably can be $\geq 1$. The copper-containing molecular sieve catalysts are aging stable such that the peak integration area percentage of the $Cu^{+2}$ peak (area $Cu^{+2}$/(area $Cu^{+2}$+area $Cu(OH)^{+1}$)) increases by $\leq 20\%$ upon aging at 800° C. for 16 hours in the presence of 10% $H_2O$/air, compared to the fresh state.

23 Claims, 10 Drawing Sheets

Related U.S. Application Data

(60) Provisional application No. 62/473,651, filed on Mar. 20, 2017.

(51) Int. Cl.
  *B01J 23/42* (2006.01)
  *B01J 35/04* (2006.01)
  *G01N 21/3563* (2014.01)
  *G01N 21/35* (2014.01)

(52) U.S. Cl.
  CPC .............. *B01J 23/42* (2013.01); *B01J 35/04* (2013.01); *G01N 21/3563* (2013.01); *B01D 2255/102* (2013.01); *B01D 2255/20761* (2013.01); *B01D 2255/9022* (2013.01); *B01D 2255/9155* (2013.01); *G01N 2021/3595* (2013.01)

(56) References Cited

U.S. PATENT DOCUMENTS

| | | | |
|---|---|---|---|
| 2011/0116982 A1 | 5/2011 | Kunieda et al. | |
| 2011/0305614 A1* | 12/2011 | Stiebels | B01J 37/0246 60/299 |
| 2012/0275977 A1* | 11/2012 | Chandler | B01J 29/0354 60/299 |
| 2013/0108544 A1 | 5/2013 | Qi et al. | |
| 2014/0271452 A1* | 9/2014 | Prasad | B01D 53/8625 423/713 |
| 2015/0252706 A1* | 9/2015 | Kosters | F01N 3/2066 60/297 |
| 2015/0265969 A1 | 9/2015 | Fedeyko et al. | |
| 2015/0367336 A1 | 12/2015 | Trukhan et al. | |
| 2016/0243533 A1* | 8/2016 | Rivas-Cardona | B01J 29/83 |
| 2016/0367941 A1* | 12/2016 | Gilbert | B01D 53/9418 |
| 2016/0367975 A1* | 12/2016 | Lu | F01N 3/2066 |
| 2017/0128914 A1* | 5/2017 | Kato | F01N 13/009 |

OTHER PUBLICATIONS

Jangjou, Yasser "Sulfur Poisoning of Small Pore Cu-exchanged CHA . . . " Dissertation. University of VA. 2018 (Year: 2018).*
Kwak, J. H. et al., Two different cationic positions in Cu-SSZ-13. Chemical Communications, 2012, vol. 48, No. 39, pp. 4758-4760.
Liu, X et al., Evolution of copper species on Cu/SAP0-34 SCR catalysts upon hydrothermal aging. Catalysis Today, 2017, vol. .281, pp. 596-604, (e-pub. May 27, 2016).
Luo, J. et al., Impact of accelerated hydrothermal aging on structure and performance of Cu-SSZ-13 SCR catalysts. SAE International Journal of Engines, 2015, vol. 8, No. 3, pp. 1181-1186.
Luo J. et al., Identification of two types of Cu sites in Cu/SSZ-13 and their unique responses to hydrothermal aging and sulfur poisoning. Catalysis Today, 2016, vol. 267, pp. 3-9 See abstract: paragraphs 2.1, 2.3; p. 7; and figure 4.
International Preliminary Report on Patentability for counterpart International Patent Application No. PCT/IB2018/051874, dated Sep. 24, 2019, 8 pages.
Supplemental Partial European Search Report for counterpart European Patent Application No. EP 18 77 0162, dated Nov. 23, 2020, 4 pages.
International Search Report for counterpart International Patent Application No. PCT/IB2018/051874, dated Jun. 29, 2018, 3 pages.
Supplementary European Search Report for counterpart European Patent Application No. EP 18 770 162, dated Apr. 26, 2021, 3 pages.
Chinese Office Action in counterpart Chinese Patent Application No. 201880032231.7, dated Apr. 8, 2022 (26 pages, with machine translation).
Decision of Refusal from corresponding Japanese Patent Application No. 2019-552011 dated Dec. 20, 2022, and its English translation.
Notice of Final Rejection from corresponding Korean Patent Appln. No. 10-2019-7029729 dated Feb. 23, 2023, and a machine generated translation.
Communication pursuant to Article 94(3) EPC from corresponding European Patent Appln. No. 18770162.8 dated Jan. 3, 2023.

* cited by examiner

SELECTIVE CATALYTIC REDUCTION ARTICLES AND SYSTEMS

This is a continuation of application Ser. No. 16/495,574, filed Sep. 19, 2019, which is a national stage of International Patent Application PCT/IB2018/051874, filed Mar. 20, 2018, and claims the benefit of U.S. Provisional Patent Application No. 62/473,651, filed Mar. 20, 2017, all of which are incorporated herein by reference.

FIELD OF THE DISCLOSURE

The present disclosure relates to selective catalytic reduction (SCR) catalysts, catalytic articles, systems and methods suitable for treating exhaust of an internal combustion engine.

BACKGROUND

Molecular sieves such as zeolites are employed in the catalysis of certain chemical reactions for example the selective catalytic reduction (SCR) of nitrogen oxides with a reductant such as ammonia, urea or hydrocarbons. Zeolites are crystalline materials having rather uniform pore sizes which range from about 3 to about 25 Ångstroms in diameter, depending upon the type of zeolite.

Catalysts employed in the SCR process must be able to retain good catalytic activity over the wide range of temperatures found in practical applications, including hydrothermal conditions with temperatures ranging, for example, from about 150° C. to about 800° C. or higher. Hydrothermal conditions are encountered by SCR catalysts, as water is a byproduct of fuel combustion. High temperature hydrothermal conditions occur in exhaust applications, for example, during the regeneration of a diesel particulate filter (DPF) or catalyzed soot filter (CSF), a component of exhaust gas treatment systems used for the removal of carbonaceous particles.

The SCR process converts nitrogen oxides (NOx) to nitrogen ($N_2$) and water ($H_2O$). Nitrogen oxides (NOx) may include $N_2O$, NO, $N_2O_3$, $NO_2$, $N_2O_4$, $N_2O_5$ or $HNO_3$. It would be desirable to have improved articles, systems and processes to convert NOx selectively within internal combustion engine exhaust streams to $N_2$. Improvements in high temperature hydrothermal durability are required for short duration transients where exhaust temperatures may reach 750° C., 800° C., 850° C. or even 900° C. Particularly important are improvements in low temperature NOx performance, for example from about 150° C. to about 300° C., after high temperature hydrothermal aging.

SUMMARY OF THE DISCLOSURE

The present disclosure provides, in some embodiments, a copper-containing molecular sieve catalyst, wherein the catalyst in a fresh state contains ion-exchanged copper wherein ≥50 at % (atomic percent) of the ion-exchanged copper is $Cu^{+2}$.

In further embodiments, the present disclosure can provide a copper-containing molecular sieve catalyst having a silica-to-alumina ratio (SAR) of about 5 to about 35 or about 14 to about 28 and a Cu/Al atomic ratio of about 0.20 to about 0.50.

In other embodiments, the present disclosure can provide a copper-containing molecular sieve catalyst, wherein the catalyst in a fresh state contains ion-exchanged copper as $Cu^{+2}$ and $Cu(OH)^{+1}$ and where, in a DRIFT spectrum of the catalyst exhibiting a perturbed T-O-T asymmetric stretching vibrational peak corresponding to $Cu^{+2}$ cations and a perturbed T-O-T asymmetric stretching vibrational peak corresponding to $Cu(OH)^{+1}$ cations, the ratio of the peak integration area for the respective $Cu^{+2}$ and $Cu(OH)^{+1}$ peaks is ≥1.

In yet other embodiments, the present disclosure can provide a copper-containing catalyst wherein the catalyst in a fresh state contains ion-exchanged copper as $Cu^{+2}$ and $Cu(OH)^{+1}$ and where, in a DRIFT spectrum of the catalyst exhibiting a T-O-T asymmetric stretching vibrational peak corresponding to $Cu^{+2}$ and a T-O-T asymmetric stretching vibrational peak corresponding to $Cu(OH)^{+1}$, the percent of integrated peak area of the T-O-T asymmetric stretching vibrational peak corresponding to $Cu^{+2}$ relative to the total integrated areas of the T-O-T asymmetric stretching vibrational peaks corresponding to both $Cu^{+2}$ and $Cu(OH)^{+1}$ (i.e., area $Cu^{+2}$/(area $Cu^{+2}$+area $Cu(OH)^{+1}$)) increases by ≤20%, ≤15%, ≤10%, or ≤5% upon aging at 800° C. for 16 hours in the presence of 10% $H_2O$/air, compared to the fresh state.

The present disclosure also can provide a catalytic article comprising a catalytic coating disposed over a substrate, where the catalytic coating comprises one or more coating layers, wherein at least one coating layer is a catalytic coating layer comprising a copper-containing molecular sieve catalyst as described above.

The present disclosure further can provide an exhaust gas treatment system comprising the catalytic article, as well as a method for treating an exhaust stream containing NOx, the method comprising passing the exhaust stream through the catalytic article or treatment system.

The present catalysts, catalytic articles, systems and methods are particularly suitable for the treatment of exhaust gases generated from diesel or gasoline engines, especially those which operate under "lean" combustion conditions with air present in excess of that required for stoichiometric combustion.

The invention includes, without limitation, the following embodiments.

Embodiment 1: A selective catalytic reduction article comprising a substrate having a catalytic coating on at least a portion of a surface thereof, the catalytic coating including a copper-containing molecular sieve containing ion-exchanged copper as $Cu^{+2}$ cations and as $Cu(OH)^{+1}$ cations, wherein the copper-containing molecular sieve exhibits a perturbed T-O-T asymmetric stretching vibrational peak corresponding to the $Cu^{+2}$ cations and a perturbed T-O-T asymmetric stretching vibrational peak corresponding to the $Cu(OH)^{+1}$ cations, and wherein an integrated peak area of the perturbed T-O-T asymmetric stretching vibrational peak corresponding to the $Cu^{+2}$ cations and an integrated peak area of the perturbed T-O-T asymmetric stretching vibrational peak corresponding to the $Cu(OH)^{+1}$ cations have a ratio of ≥1 as measured using Diffuse Reflectance Infrared Fourier Transform (DRIFT) spectroscopy.

Embodiment 2: The selective catalytic reduction article of any preceding embodiment, wherein the copper-containing molecular sieve exhibits the perturbed T-O-T asymmetric stretching vibrational peaks corresponding to the $Cu^{+2}$ cations and the $Cu(OH)^{+1}$ cations at about 900 $cm^{-1}$ and about 950 $cm^{-1}$, respectively, in the infrared spectrum, or wherein the copper-containing molecular sieve exhibits the perturbed T-O-T asymmetric stretching vibrational peaks corresponding to the $Cu^{+2}$ cations and the $Cu(OH)^{+1}$ cations at about 900 $cm^{-1}$ and about 970 $cm^{-1}$, respectively, in the infrared spectrum.

Embodiment 3: The selective catalytic reduction article of any preceding embodiment, wherein a percentage of the total integrated peak area that is attributable to the perturbed T-O-T asymmetric stretching vibrational peak corresponding to the $Cu^{+2}$ cations is calculated by dividing the integrated peak area for the perturbed T-O-T asymmetric stretching vibrational peak corresponding to the $Cu^{+2}$ cations by the integrated peak areas for the perturbed T-O-T asymmetric stretching vibrational peaks corresponding to the $Cu^{+2}$ cations and $Cu(OH)^{+1}$ cations combined, and wherein the percentage of the total integrated peak area that is attributable to the perturbed T-O-T asymmetric stretching vibrational peak for $Cu^{+2}$ cations is ≥50%.

Embodiment 4: The selective catalytic reduction article of any preceding embodiment, wherein the contribution by the perturbed T-O-T asymmetric stretching vibrational peak corresponding to the $Cu^{+2}$ cations to the combined integrated peak areas for the perturbed T-O-T asymmetric stretching vibrational peaks of the $Cu^{+2}$ cations and $Cu(OH)^{+1}$ cations for the copper-containing molecular sieve in an aged state is increased by ≤20% relative to the contribution for the copper-containing molecular sieve in the fresh state, wherein the aged state is defined by having aged the selective catalytic reduction article at a temperature of about 800° C. for a time of about 16 hours in the presence of air with an $H_2O$ content of about 10 mol. %.

Embodiment 5: The selective catalytic reduction article of any preceding embodiment, wherein the total amount of copper in the copper-containing molecular sieve, calculated as copper oxide, is about 1.0 wt. % to about 10 wt. %, based on the total weight of the copper-containing molecular sieve.

Embodiment 6: The selective catalytic reduction article of any preceding embodiment, wherein the copper-containing molecular sieve comprises crystals or agglomerates having a mean size ≤2.0 microns.

Embodiment 7: The selective catalytic reduction article of any preceding embodiment, wherein the copper-containing molecular sieve comprises a small pore molecular sieve selected from the group consisting of framework types AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, mixtures thereof, and intergrowths thereof.

Embodiment 8: The selective catalytic reduction article of any preceding embodiment, wherein the molecular sieve comprises a medium pore molecular sieve selected from the group consisting of framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, mixtures thereof, and intergrowths thereof.

Embodiment 9: The selective catalytic reduction article of any preceding embodiment, wherein the molecular sieve comprises a large pore molecular sieve selected from the group consisting of framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, mixtures thereof, and intergrowths thereof.

Embodiment 10: The selective catalytic reduction article of any preceding embodiment, wherein the molecular sieve is selected from the group consisting of aluminosilicate zeolites, borosilicates, gallosilicates, SAPOs, AlPOs, MeAPSOs, MeAPOs, and combinations thereof.

Embodiment 11: The selective catalytic reduction article of any preceding claim, wherein the molecular sieve has CHA cages and double-six ring building units and is selected from the group consisting of Cu-CHA, Cu-SAPO-34, AEI, Cu-SAPO-18, and combinations thereof Embodiment 12: The selective catalytic reduction article of any preceding embodiment, wherein the selective catalytic reduction article further comprises one or more catalytically active metals selected from the group consisting of manganese, iron, cobalt, nickel, cerium, platinum, palladium and rhodium; or containing one or more base metals selected from the group consisting of sodium, potassium, magnesium, calcium, strontium, barium, and combinations thereof.

Embodiment 13: The selective catalytic reduction article of any preceding embodiment, wherein the catalytic coating comprises: a first catalytic coating comprising the copper-containing molecular sieve, and a second catalytic coating that is different from the first catalytic coating.

Embodiment 14: The selective catalytic reduction article of any preceding embodiment, wherein the second catalytic coating comprises a copper-containing molecular sieve that is different from the copper-containing molecular sieve in the first coating.

Embodiment 15: The selective catalytic reduction article of any preceding embodiment, wherein the second catalytic coating comprises a platinum group metal on a refractory metal oxide support.

Embodiment 16: The selective catalytic reduction article of any preceding embodiment, wherein the platinum group metal is present in an amount of about 0.5 g/ft³ to about 30 g/ft³, based on the total volume of the substrate.

Embodiment 17: The selective catalytic reduction article of any preceding embodiment, wherein the catalytic coating including the copper-containing molecular sieve is present in an amount of about 0.1 g/in³ to about 4.5 g/in³, based on the total volume of the substrate.

Embodiment 18: The selective catalytic reduction article of any preceding embodiment, wherein the first catalytic coating and the second catalytic coating are in a layered configuration or zoned configuration.

Embodiment 19: The selective catalytic reduction article of any preceding embodiment, wherein the substrate is a porous wall-flow filter or a flow-through monolith.

Embodiment 20: An exhaust gas treatment system comprising:
a selective catalytic reduction article according to any preceding embodiment; and
a reductant injector in fluid communication with and upstream of the selective catalytic reduction article.

Embodiment 21: The exhaust gas treatment system of any preceding embodiment, further comprising one or more of a diesel oxidation catalyst, a soot filter, a lean NOx trap (LNT), and an ammonia oxidation catalyst.

Embodiment 22: A method for treating an exhaust stream containing NOx, comprising passing the exhaust stream through a selective catalytic reduction article or an exhaust gas treatment system of any preceding embodiment.

Embodiment 23: A method for identifying a catalytic material that is stable towards aging, the method comprising: providing a plurality of samples that each comprise particles of a copper-containing molecular sieve containing ion-exchanged copper as $Cu^{+2}$ cations and as $Cu(OH)^{+1}$ cations; subjecting the particles of the copper-containing molecular sieve to Diffuse Reflectance Infrared Fourier Transform (DRIFT) spectroscopy so as to evaluate perturbed T-O-T asymmetric stretching vibrational peaks corresponding to the $Cu^{+2}$ cations in the copper-containing molecular sieve and perturbed T-O-T asymmetric stretching vibrational peaks corresponding to the $Cu(OH)^{+1}$ cations in the copper-containing molecular sieve; and selecting one or more of the samples wherein the copper-containing molecular sieve exhibits a ratio for an integrated peak area of the perturbed T-O-T asymmetric stretching vibrational peak corresponding to the $Cu^{+2}$ cations to an integrated peak area of the perturbed T-O-T asymmetric stretching vibrational peak corresponding to the $Cu(OH)^{+1}$ cations that is ≥1.

Embodiment 24: The method of any preceding embodiment, wherein a percentage of the total integrated peak area that is attributable to the perturbed T-O-T bond vibrational peak corresponding to the $Cu^{+2}$ cations is calculated by dividing the integrated peak area for the perturbed T-O-T bond vibrational peak corresponding to the $Cu^{+2}$ cations by the integrated peak areas for the perturbed T-O-T bond vibrational peak corresponding to the $Cu^{+2}$ cations and the perturbed T-O-T bond vibrational peak corresponding to the $Cu(OH)^{+1}$ cations combined, and wherein the method comprises selecting one or more samples wherein the percentage of the total integrated peak area that is attributable to the perturbed T-O-T bond vibrational peak for $Cu^{+2}$ cations is ≥50%.

Embodiment 25: The method of any preceding embodiment, wherein the plurality of copper-containing molecular sieve samples is subjected to the DRIFT spectroscopy in a fresh state, and wherein the method further comprises:

aging the plurality of samples at a temperature of about 800° C. for a time of about 16 hours in the presence of air with an $H_2O$ content of about 10 mol. % to form aged samples;

subjecting the aged samples to the DRIFT spectroscopy; and selecting one or more of the samples wherein the contribution to the total integrated peak area by the perturbed T-O-T asymmetric stretching vibrational peak corresponding to the $Cu^{+2}$ cations for the one or more samples in an aged state is increased by ≤20% relative to the contribution to the total integrated peak area by the perturbed T-O-T asymmetric stretching vibrational peak corresponding to the $Cu^{+2}$ cations for the one or more samples in the fresh state.

Embodiment 26: A method of manufacturing a catalytic article, the method comprising: developing a process for preparing a first composition comprising copper-containing molecular sieves; analyzing at least a sample of the first composition using DRIFT spectroscopy to determine the relative amount of $Cu^{+2}$ and $Cu(OH)^{+1}$ in the first composition based on a comparison of intensities of perturbed T-O-T asymmetric stretching vibrational peaks corresponding to the $Cu^{+2}$ and $Cu(OH)^{+1}$; selecting the process for commercial manufacturing of the first composition if the contribution by the perturbed T-O-T asymmetric stretching vibrational peak corresponding to $Cu^{+2}$ to the total integrated peak areas of the perturbed T-O-T asymmetric stretching vibrational peaks is ≥50%; and applying the commercially manufactured first composition made by the process to a substrate to produce the catalytic article.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1:
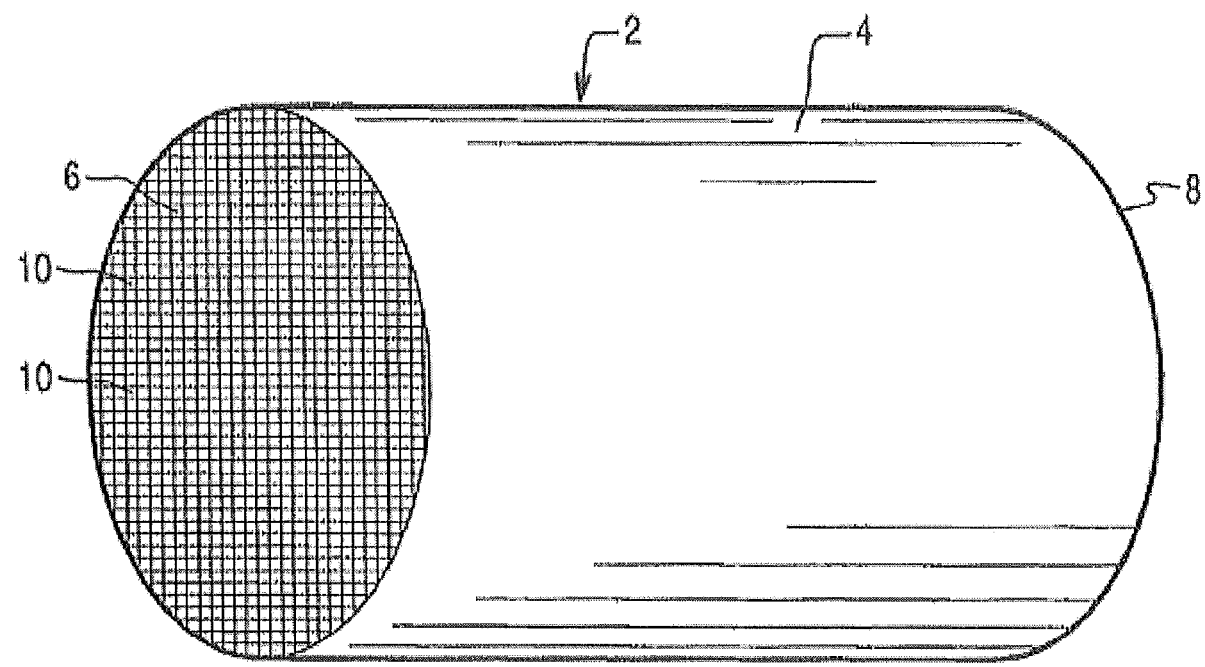
FIG. 1 is a perspective view of a honeycomb-type substrate carrier which may comprise a catalyst article in the form of a washcoat composition in accordance with the present disclosure.

The present catalyst compositions are suitable for treatment of exhaust gas streams of internal combustion engines, for example gasoline, light-duty diesel and heavy duty diesel engines. The catalyst compositions are also suitable for treatment of emissions from stationary industrial processes or for catalysis in chemical reaction processes.

High surface area refractory metal oxide supports are materials used as catalyst supports that receive precious metals, stabilizers, promoters, binders and the like through association, dispersion, impregnation or other suitable methods. High surface area refractory metal oxide supports can comprise an activated compound selected from the group consisting of alumina, zirconia, silica, titania, ceria, lanthana, baria and combinations thereof.

Molecular Sieves

Molecular sieves refer to materials having an extensive three-dimensional network of oxygen ions containing generally tetrahedral type sites and having a pore distribution of relatively uniform pore size. A zeolite is a specific example of a molecular sieve, further including silicon and aluminum. Reference to a "non-zeolite-support" or "non-zeolitic support" in a catalyst layer refers to a material that is not a zeolite. Examples of such non-zeolitic supports include, but are not limited to, high surface area refractory metal oxides.

Molecular sieves comprise small pore, medium pore, and large pore molecular sieves or combinations thereof. A small pore molecular sieve contains channels defined by up to eight tetrahedral atoms. A medium pore molecular sieve contains channels defined by ten-membered rings. A large pore molecular sieve contains channels defined by rings of at least twelve tetrahedral atoms.

Small pore molecular sieves have an 8-ring opening and may have for instance a double 6-ring (D6R) or 6-ring structural unit. The cage building units include the CHA cage, various modifications of the CHA cage, LTA cage, GME cage and the like.

Small pore molecular sieves are selected from the group consisting of aluminosilicate molecular sieves, metal-containing aluminosilicate molecular sieves, aluminophosphate (ALPO) molecular sieves, metal-containing aluminophosphate (MeALPO) molecular sieves, silico-aluminophosphate (SAPO) molecular sieves, and metal-containing silico-aluminophosphate (MeSAPO) molecular sieves and mixtures thereof. For example, small pore molecular sieves are selected from the group consisting of framework types AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI and mixtures or intergrowths thereof. For instance, the small pore molecular sieve is selected from the group of framework types CHA, LEV, AEI, AFT, AFX, ERI, LTA, SFW, KFI and DDR.

Medium pore molecular sieves are selected from the group consisting of framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof. For instance, the medium pore molecular sieves are selected from the group consisting of framework types FER, MEL, MFI and STT.

Large pore molecular sieves are selected from the group consisting of framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof. For instance, the large pore molecular sieves are selected from the group consisting of framework types AFI, BEA, FAU, MAZ, MOR and OFF.

For example, molecular sieves comprise a framework type selected from the group consisting of AEI, BEA (beta zeolites), CHA (chabazite), FAU (zeolite Y), FER (ferrierite), MFI (ZSM-5) and MOR (mordenite). Non-limiting examples of zeolites having these structures include chabazite, faujasite, zeolite Y, ultrastable zeolite Y, beta zeolite, mordenite, silicalite, zeolite X and ZSM-5.

Useful molecular sieves have 8-ring pore openings and double-six ring secondary building units, for example, those having structure types AEI, AFT, AFX, CHA, EAB, ERI, KFI, LEV, SAS, SAT or SAV. Included are any and all isotopic framework materials such as SAPO, ALPO and MeAPO materials having the same structure type.

Aluminosilicate zeolite structures do not include phosphorus or other metals isomorphically substituted in the framework. That is, "aluminosilicate zeolite" excludes aluminophosphate materials such as SAPO, ALPO and MeAPO materials, while the broader term "zeolite" includes aluminosilicates and aluminophosphates.

In one or more embodiments, the 8-ring small pore molecular sieve has the CHA crystal structure. Copper-containing chabazite is abbreviated as CuCHA. In further embodiments, the molecular sieve can have the SAPO crystal structure—i.e., CuSAPO.

A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 1000 to about 200° C., for instance from about 135° C. to about 170° C. Typical reaction times are between 1 hr and 30 days and in some embodiments, from 10 hours to 3 days. At the conclusion of the reaction, the pH is optionally adjusted to between 6 and 10, for example between 7 and 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C.

Molecular sieves having a CHA structure may be prepared for instance according to methods disclosed in U.S. Pat. Nos. 4,544,538 and 6,709,644, the disclosures of which are incorporated herein by reference.

The molecular sieves may have a silica-to-alumina ratio (SAR) of about 1 to about 1000. In some embodiments, the molecular sieve may have an SAR of about 2 to about 750, about 5 to about 250, or about 5 to about 50.

Advantageously, the molecular sieves of the present catalyst compositions are small pore, medium pore or large pore molecular sieves.

Catalytic Molecular Sieves

The catalyst for example contains ion-exchanged copper where the atomic percentage (atomic % or at %) of ion-exchanged copper in a $Cu^{+2}$ state in a fresh sample compared to the atomic % of ion-exchanged copper in a $Cu^{+2}$ state in the sample aged at 800° C. for 16 hours in the presence of 10% $H_2O$/air remains stable. As further described herein, such stability has been found to be highly desirable in identifying catalytic materials with improved NOx conversion activity. Preferably, the atomic percentages for a fresh sample versus an aged sample are within 20%, within 15%, within 10%, or within 5% of each other. The atomic percentage of ion-exchanged copper in $Cu^{+2}$ state means relative to all ion-exchanged copper.

In the present invention, the copper present in the ion-exchange sites (ion-exchanged copper) of the molecular sieves is ≥50 at % (atomic percent) $Cu^{+2}$. Other ion-exchanged copper is in the form of, for example, $Cu(OH)^{+1}$. This is after exposure to air and/or moisture and thus after oxidation. The $Cu^{+2}$ atomic percentage is determined based upon analysis of infrared spectra of fresh and aged samples that allow for identification of the relative copper species present in the copper-exchanged catalytic material.

In some embodiments, the ion-exchanged copper may be identified for instance via DRIFT spectroscopy (Diffuse Reflectance Infrared Fourier Transform spectroscopy) carried out using known methods. Copper species may be detected by monitoring perturbed T-O-T bond (Si—O—Al and Si—O—Si) vibrations of a molecular sieve. Structural vibrations of T-O-T bonds of molecular sieves exhibit absorption peaks from about 1350 $cm^{-1}$ to about 920 $cm^{-1}$ and about 850 $cm^{-1}$ to about 620 $cm^{-1}$ for asymmetric and symmetric vibration modes, respectively. Perturbed T-O-T bond vibrations are observed when copper ions are exchanged into cationic positions of a molecular sieve, due to strong interactions between copper ions and framework oxygen. Peak positions depend on the nature of the copper ions and the structure of the molecular sieve framework. Peak intensity and peak integrated area can depend on the quantity of copper ions in the exchange sites. Accordingly, DRIFT spectroscopy is effective for qualitative analysis of the nature of the copper-exchanged molecular sieve catalytic material. In general, this invention contemplates using for characterization any vibrational modes that are perturbed (i.e., shifted) due to the presence of different species of metallic ions interacting with the T-O-T framework of the molecular sieves. For example, as disclosed herein, copper species may be detected by monitoring perturbed T-O-T asymmetric stretching vibrational modes by using DRIFT spectroscopy.

DRIFT spectroscopy may be performed as in the present Examples. See, also, Luo et al., "Identification of two types of Cu sites in Cu/SSZ-13 and their unique responses to hydrothermal aging and sulfur poisoning," Catalysis Today, 267 (2016), 3-9; and Kwak et al., "two different cationic positions in Cu-SSZ-13?," Chem. Commun., 2012, 48, 4758-4760.

In DRIFT spectra of aluminosilicate chabazite CuCHA, in addition to the asymmetric and symmetric vibrations of unperturbed T-O-T (Si—O—Al) bonds at ca. 1040 and ca. 810 $cm^{-1}$, two absorptions are observed at ca. 900 $cm^{-1}$ and ca. 950 $cm^{-1}$, attributed to a perturbed T-O-T asymmetric stretching vibration with $Cu^{+2}$ associated with an Al pair and a perturbed T-O-T asymmetric stretching vibration with $Cu(OH)^{+1}$ associated with a single Al, respectively. In the present disclosure, the term "exhibiting a $Cu^{+2}$ peak and a $Cu(OH)^{+1}$ peak" refers to the perturbed absorptions that are identified in the DRIFT spectra. For example, in the case of a copper chabazite catalytic material, infrared absorptions at ca. 900 $cm^{-1}$ and ca. 950 $cm^{-1}$ corresponding to perturbed T-O-T asymmetric stretching vibrations can be correlated to the presence of $Cu^{+2}$ and $Cu(OH)^{+1}$, respectively. Similarly, in the case of a copper SAPO catalytic material, infrared absorptions at ca. 900 $cm^{-1}$ and ca. 970 $cm^{-1}$ corresponding to perturbed asymmetric stretching vibrations can be correlated to the presence of $Cu^{+2}$ and $Cu(OH)^{+1}$, respectively.

Without being bound by theory, it is believed that $Cu^{+2}$ balancing the charge of an Al pair is more hydrothermally stable than $Cu(OH)^{+1}$ associated with a single Al, thus providing catalysts capable of high NOx reduction activity and high hydrothermal stability. Also without being bound by theory, it is believed that Cu cations balance the charge created by Si substituting for P in a SAPO molecular sieve. The perturbed T-O-T bond vibrations for SAPO are related to the structural vibrations due to the Si, Al and P in the tetrahedral "T" sites. As such, catalysts with a higher relative percentage of $Cu^{+2}$ in the molecular sieve framework (as determined via DRIFT analysis as discussed above through identification of perturbed T-O-T bonds, such as those corresponding to perturbed T-O-T asymmetric stretching vibrations) can be identified and can provide improved catalytic performance and aging stability.

In some embodiments, preferred stability can be associated with a defined ratio between the integrated peak area of the perturbed T-O-T asymmetric stretching peak corresponding to the $Cu^{+2}$ cations (e.g., the peak for perturbed T-O-T bonds at about 900 $cm^{-1}$ in a DRIFT spectrum) and the integrated peak area of the perturbed T-O-T asymmetric stretching peak corresponding to the $Cu(OH)^{+1}$ cations (e.g., the peak for perturbed T-O-T bonds at about 950 $cm^{-1}$ in a DRIFT spectrum for CuCHA or at about 970 $cm^{-1}$ in a DRIFT spectrum for CuSAPO). For example, the ratio of the integrated peak area for perturbed T-O-T asymmetric stretching peaks corresponding to $Cu^{+2}$ relative to peaks corresponding to $Cu(OH)^{-1}$ can be ≥1, ≥1.2, or ≥1.5. For example, the ratio of the integrated peak areas can be about 1 to about 5 about 1.2 to about 4, or about 1.5 to about 3.

In further embodiments, suitable copper-exchanged molecular sieves can be identified in relation to the contribution to the total peak area of the perturbed T-O-T asymmetric stretching vibrational peaks by the perturbed T-O-T asymmetric stretching vibrational peak for $Cu^{+2}$. This can be calculated using the formula provided below, wherein "area $Cu^{+2}$" is the integrated peak area perturbed T-O-T asymmetric stretching vibrational peaks corresponding to $Cu^{+2}$ (i.e., the peak at about 900 $cm^{-1}$ in the DRIFT spectrum), and "area $Cu(OH)^{+1}$" is the integrated peak area for perturbed T-O-T asymmetric stretching vibrational peaks corresponding to $Cu(OH)^{+1}$ (i.e., the peak at about 950 cm-1 in the DRIFT spectrum for CuCHA and at about 970 $cm^{-1}$ in the DRIFT spectrum for CuSAPO).

$$\frac{(\text{area } Cu^{+2})}{(\text{area } Cu^{+2} + \text{area } Cu(OH)^{+1})}$$

Preferably, the percentage of the total peak area that is attributable to the perturbed T-O-T asymmetric stretching vibrational peak for $Cu^{+2}$ is at least 50%, at least 55%, or at least 60%, such as about 55% to about 95%, about 60% to about 90%, or about 65% to about 85%.

While the integrated area under the respective curves for the perturbed absorptions presently has not been correlated to an amount of the relative atomic % of the individual copper species present, maintenance of the ratio with aging is clearly indicative of a stable structure and has been correlated to a material with stable catalytic activity.

In some embodiments, the foregoing ratio and percentage may be substantially unchanged between the fresh state and the aged state for the copper-exchanged molecular sieve. For example, after the copper-exchanged molecular sieve has been aged at a temperature of about 800° C. for a time of about 16 hours in the presence of air with an $H_2O$ content of about 10 mol %, the percentage of the total peak area corresponding to perturbed T-O-T asymmetric stretching vibrations that is attributable to the perturbed T-O-T asymmetric stretching vibrational peak for $Cu^{+2}$ can be increased by ≤30%, ≤20%, or ≤10%.

Without being bound by theory, it is believed that all molecular sieves constructed from CHA and double-six rings will exhibit similar vibrational modes, and that Cu cations will perturb the vibrational spectra in a similar manner. Such molecular sieves are CHA, SAPO-34, AEI and SAPO-18. Other small, medium and large molecular sieves will exhibit their own unique vibrational spectra, and Cu cations will perturb the vibrational modes in a similar manner.

The copper-containing molecular sieves are prepared for example via ion-exchange from for example a $Na^+$ containing molecular sieve ($Na^+$ form). The $Na^+$ form generally refers to the calcined form without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$ form is employed for ion-exchange with copper. Optionally, the $NH_4^+$-exchanged molecular sieve is calcined to the $H^+$-form which may also be employed for ion-exchange with copper.

Copper is ion-exchanged into molecular sieves with alkali metal, $NH_4^+$ or $H^+$ forms with copper salts such as copper acetate, copper sulfate and the like, for example as disclosed in U.S. Pat. No. 9,242,238, the disclosure of which is incorporated herein by reference. For instance a $Na^+$, $NH_4^+$ or $H^+$ form of a molecular sieve is mixed with an aqueous salt solution and agitated at an elevated temperature for a suitable time. The slurry is filtered and the filter cake is washed and dried.

Further, at least a portion of a catalytically active metal may be included during a molecular sieve synthetic process such that a tailored colloid contains a structure directing agent, a silica source, an alumina source and a metal ion (e.g. copper) source, as disclosed in U.S. Pat. No. 9,272,272, the disclosure of which is incorporated herein by reference.

The total amount of copper in the molecular sieve is for example about 1.0 wt. % to about 10 wt. %, based on the total weight of the copper-containing molecular sieve. In some embodiments, the total amount of copper in the molecular sieve can be about 1.5 wt. % to about 9 wt. %, about 2.0 wt. % to about 8 wt. %, or about 3.0 wt. % to about 7 wt. %, based on the total weight of the copper-containing molecular sieve.

The total amount of copper includes ion-exchanged copper and copper associated with the molecular sieve but not ion-exchanged.

Amounts of copper in a molecular sieve are reported as the oxide, CuO. The total dry weight of the molecular sieve includes the any added/exchanged metals like copper.

The total amount of copper in a molecular sieve, for example an aluminosilicate zeolite, may also be defined by the copper-to-aluminum atomic ratio. For example, the Cu/Al atomic ratio may be about 0.20 to about 0.50. In some embodiments, the Cu/Al atomic ratio can be about 0.25 to about 0.50, about 0.3 to about 0.50, or about 0.35 to about 0.50.

The molecular sieves containing copper may each have a sodium content (reported as $Na_2O$ on a volatile free basis) of below 2 wt. %, based on the total weight of the catalyst composition. In more specific embodiments, sodium content is below 2500 ppm. The molecular sieves may each have an atomic sodium-to-aluminum ratio of less than about 0.7, for example about 0.02 to about 0.7. The molecular sieves may each have an atomic copper to sodium ratio of greater than about 0.5, for example about 0.5 to about 50.

The present copper-containing molecular sieves may exhibit a BET surface area, determined according to DIN 66131, of at least about 400 $m^2/g$, at least about 550 $m^2/g$, or at least about 650 $m^2/g$, for example, about 400 to about 750 $m^2/g$ or, about 500 to about 750 $m^2/g$. The present molecular sieves may have a mean crystal size of about 10 nanometers to about 20 microns, preferably about 0.1 microns to about 2.0 microns as determined via Scanning Electron Microscopy (SEM). Advantageously, the mean crystal size is ≤0.5 microns or ≤2.0 microns.

Catalytic Coating/Substrate

The molecular sieves may be provided in the form of a powder or a spray-dried material which is admixed with or coated with suitable modifiers. Modifiers include silica, alumina, titania, zirconia and refractory metal oxide binders (for example a zirconium precursor). The powder or the sprayed material, optionally after admixing or coating by suitable modifiers, may be formed into a slurry, for example with water, which is deposited upon a suitable substrate as part of a catalytic coating, disclosed for example in U.S. Pat. No. 8,404,203, the disclosure of which is incorporated herein by reference.

A catalytic coating contains one or more carriers containing active catalytic species. A catalytic coating may typically be applied in the form of a washcoat containing carriers having catalytically active species thereon. A washcoat is formed by preparing a slurry containing a specified solids content (e.g., 10-60% by weight) of carriers in a liquid vehicle, which is then coated onto a substrate and dried and calcined to provide a coating layer. When multiple coating layers are applied, the substrate is dried and/or calcined after each layer is applied. A final calcination step is performed after the number of desired multiple layers are applied.

Coating layers of molecular sieves may be prepared using a binder, for example, a $ZrO_2$ binder derived from a suitable precursor such as zirconyl acetate or any other suitable zirconium precursor such as zirconyl nitrate. Zirconyl acetate binder provides a catalytic coating that remains homogeneous and intact after thermal aging, for example, when the catalyst is exposed to high temperatures of at least about 600° C., for example, about 800° C. and higher, and high water vapor environments of about 5% or 10% or more. Other potentially suitable binders include, but are not limited to, alumina and silica. Alumina binders include aluminum oxides, aluminum hydroxides, and aluminum oxyhydroxides. Aluminum salts and colloidal forms of alumina many also be used. Silica binders include various forms of $SiO_2$, including colloidal silica. Binder compositions may include any combination of zirconia, alumina, and silica.

Any of present coating layers may contain $ZrO_2$ and/or $Al_2O_3$ binders.

The term "catalyst" or "catalyst composition" refers to a material that promotes a chemical reaction. The catalyst includes the "catalytically active species" and the "carrier" that carries or supports the active species. For example, molecular sieves including zeolites are carriers/supports for present copper active catalytic species. Likewise, refractory metal oxide particles may be a carrier for platinum group metal catalytic species.

Present copper-containing catalysts are highly effective as selective catalytic reduction (SCR) catalysts of nitrogen oxides (NOx) to $N_2$. Typically, a reductant such as ammonia is employed. Urea may be employed as an ammonia precursor.

The catalytically active species are also termed "promoters" as they promote chemical reactions. For instance, the present copper-containing molecular sieves may be termed copper-promoted molecular sieves. A "promoted molecular sieve" refers to a molecular sieve to which catalytically active species are intentionally added.

The term "substrate" refers in general to a monolithic material onto which a catalytic coating is disposed, for example a flow-through monolith or monolithic wall-flow filter. In one or more embodiments, the substrate is a ceramic or metal having a honeycomb structure. Any suitable substrate may be employed, such as a monolithic substrate of the type having fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross-section.

Present substrates are 3-dimensional having a length and a diameter and a volume, similar to a cylinder. The shape does not necessarily have to conform to a cylinder. The length is an axial length defined by an inlet end and an outlet end.

Flow-through monolith substrates for example have a volume of about 50 $in^3$ to about 1200 $in^3$, a cell density of about 60 cells per square inch (cpsi) to about 500 cpsi or up to about 900 cpsi, for example about 200 to about 400 cpsi and a wall thickness of about 50 to about 150 microns or about 200 microns.

The substrate may be a "flow-through" monolith as described above. Alternatively, a catalytic coating may be disposed on a wall-flow diesel particulate filter (DPF), thus producing a catalyzed soot filter (CSF) or Catalyzed DPF (CDPF). If a wall-flow substrate is utilized, the resulting system will be able to remove particulate matter along with gaseous pollutants. The wall-flow filter substrate can be made from materials commonly known in the art, such as cordierite, aluminum titanate or silicon carbide. Loading of the catalytic coating on a wall-flow substrate will depend on substrate properties such as porosity and wall thickness and typically will be lower than the catalyst loading on a flow-through substrate.

Wall-flow filter substrates useful for supporting the SCR catalytic coatings have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross-section, although far fewer may be used. For example, the typical carrier usually has from about 100 to about 300, cells per square inch ("cpsi"). The cells can have cross-sections that are rectangular, square, circular, oval, triangular, hexagonal, or are of other polygonal shapes. Wall-flow substrates typically have a wall thickness from about 150 microns to about 500 microns, for example from about 200 microns to about 350 microns. Wall-flow filters will generally have a wall porosity of at least 40% with an average pore size of at least 10 microns prior to disposition of the catalytic coating. For instance, wall-flow filters will have a wall porosity of from about 50 to about 75% and an average pore size of from about 10 to about 30 microns prior to disposition of a catalytic coating.

Figure 2:
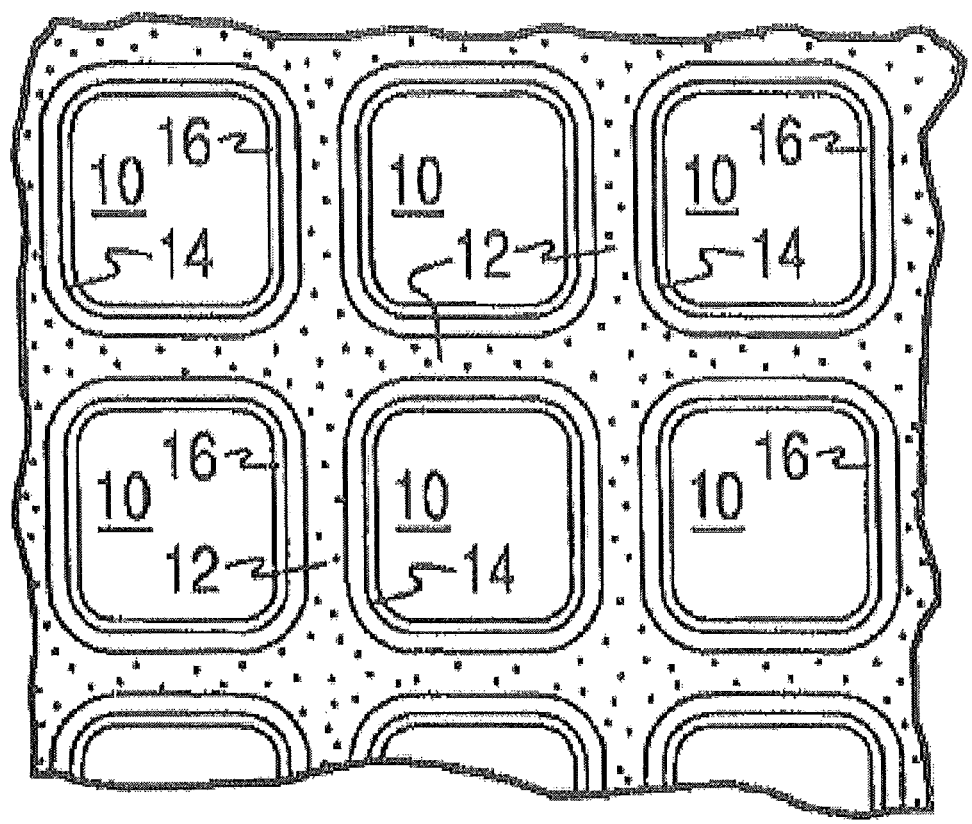
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate carrier is a monolithic flow-through substrate.

FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
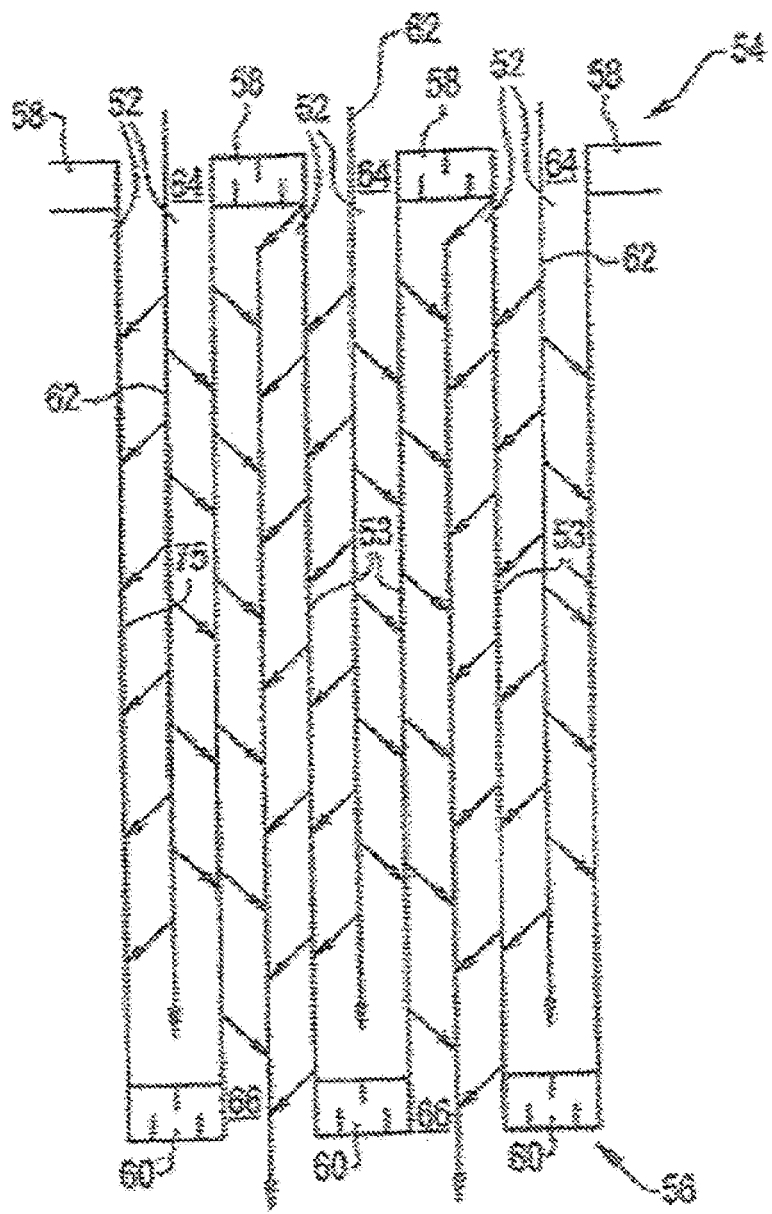
FIG. 3 is a cutaway view of a section enlarged relative to FIG. 1, wherein the honeycomb-type substrate carrier in FIG. 1 represents a wall flow filter substrate monolith.

Alternatively, FIGS. 1 and 3 can illustrate an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

Catalyzed wall-flow filters are disclosed for instance in U.S. Pat. No. 7,229,597, the disclosure of which is incorporated here by reference. This reference teaches a method of applying a catalytic coating such that the coating permeates the porous walls, that is, is dispersed throughout the walls. Flow-through and wall-flow substrates are also taught for example in U.S. Pat. app. No. 62/072,687, published as WO2016/070090.

The present catalytic coating may be on the wall surface and/or in the pores of the walls, that is "in" and/or "on" the filter walls. Thus, the phrase "having a catalytic coating thereon" means on any surface, for example on a wall surface and/or on a pore surface.

The inlet end of a substrate is synonymous with the "upstream" end or "front" end. The outlet end is synonymous with the "downstream" end or "rear" end. A substrate will have a length and a width.

The ceramic substrate may be made of any suitable refractory material, e.g. cordierite, cordierite-α-alumina, aluminum titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates useful in the present invention may also be metallic, comprising one or more metals or metal alloys. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel.

The catalytic coating comprises one or more thin adherent coating layers, where at least one coating layer comprises the copper-containing catalyst. The coating is disposed on and in adherence to the substrate. The entire coating comprises the individual "coating layers". The catalytic coating may be "zoned", comprising zoned catalyst layers. This may also be described as "laterally zoned". For example, a first layer may extend from the inlet end towards the outlet end extending from about 10 to about 90%, about 10% to about 50%, or about 10% to about 25% of the substrate length. A second layer may extend from the outlet end towards the inlet end extending from about 10% to about 90%, about 10% to about 50%, or about 10% to about 25% of the substrate length. The first and second layers may be adjacent to each other and not overlay each other. Alternatively, the first and second layers may overlay a portion of each other, providing a third "middle" zone. The middle zone may for example extend from about 5% to about 80% of the substrate length. Alternatively, the first layer may extend from the outlet end and the second layer may extend from the inlet end.

An upstream zone is upstream of a downstream zone. A zone of a catalyzed substrate is defined as a cross-section having a certain coating structure thereon.

First and second layers may each extend the entire length of the substrate or may each extend a portion of the length of the substrate and may overlay or underlay each other, either partially or entirely. Each of the first and second layers may extend from either the inlet or outlet end. Coating layers that overlay or underlay each other, partially or entirely, may be termed "top" and "bottom" coating layers, where the top layer is "over" the bottom layer. The top layer over the bottom layer means they may be in direct contact or may have an interlayer in-between.

First and/or second coating layers may be in direct contact with the substrate. Alternatively, one or more "undercoats" may be present, so that at least a portion of the first and/or the second coating layers are not in direct contact with the substrate (but rather with the undercoat). One or more "overcoats" may also be present, so that at least a portion of the first and/or second coating layers are not directly exposed to a gaseous stream or atmosphere (but rather are in contact with the overcoat).

First and second coating layers may be in direct contact with each other without a "middle" overlapping zone. Alternatively, the first and second coating layers may not be in direct contact, with a "gap" between the two zones. In the case of an "undercoat" or "overcoat" the gap between the first and second SCR layer is termed an "interlayer."

An undercoat is a layer "under" a further coating layer, an overcoat is a layer "over" a further coating layer and an interlayer is a layer "between" two further coating layers.

The interlayer(s), undercoat(s) and overcoat(s) may contain one or more catalysts or may be free of catalysts.

The present catalytic coatings may comprise more than one identical layer, for instance more than one identical layer comprising the present copper-containing catalyst.

Figure 4A:
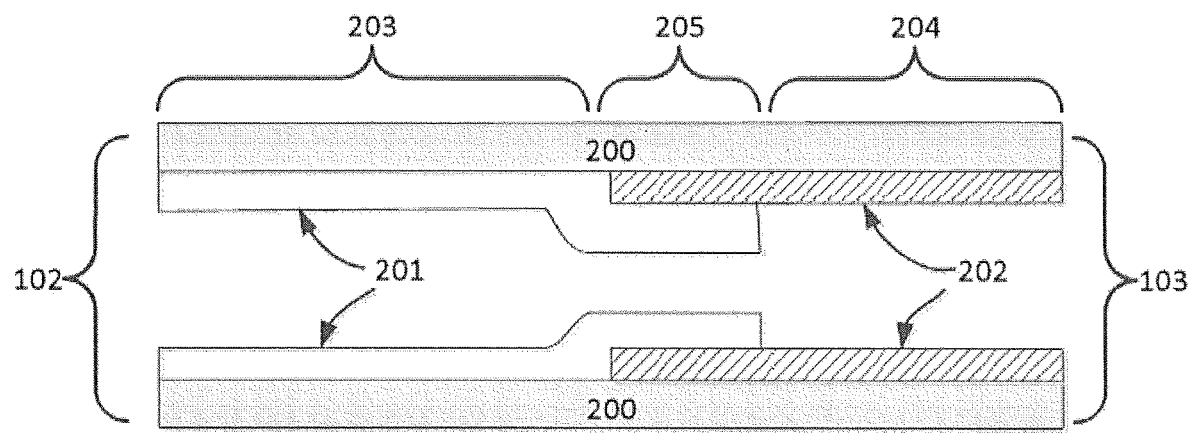
FIG. 4a is a cross-section showing coating layers and/or coating zones on one or more substrates according to exemplary embodiments of the present disclosure.
Figure 4B:
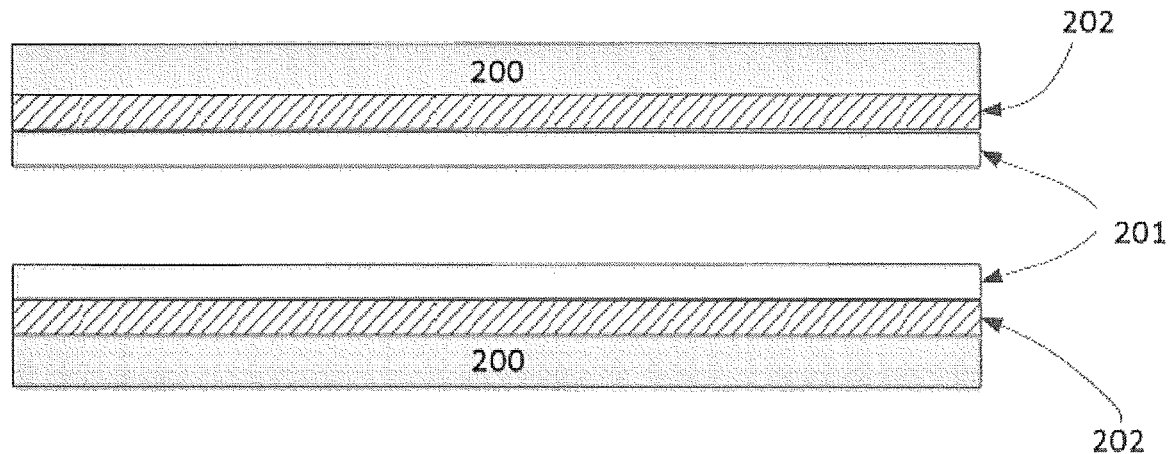
FIG. 4b is a cross-section showing coating layers and/or coating zones on one or more substrates according to exemplary embodiments of the present disclosure

FIGS. 4a and 4b show some possible coating layer configurations with two coating layers. Shown are substrate walls 200 onto which coating layers 201 (top coat) and 202 (bottom coat) are disposed. This is a simplified illustration, and in the case of a porous wall-flow substrate, not shown are pores and coatings in adherence to pore walls and not shown are plugged ends. In FIG. 4a, bottom coating layer 202 extends from the outlet about 50% of the substrate length and top coating layer 201 extends from the inlet greater than 50% of the length and overlays a portion of layer 202, providing an upstream zone 203, a middle zone 205 and a downstream zone 204. In FIG. 4b, coating layers 201 and 202 each extend the entire length of the substrate with top layer 201 overlaying bottom layer 202. The substrate of FIG. 4b does not contain a zoned coating configuration. In FIGS. 4a and 4b, either layer 201, 202 or both may contain a present copper-containing molecular sieve. FIGS. 4a and 4b may be useful to illustrate coating compositions on the wall-through substrate or the flow-through substrate.

The present catalytic coating, as well as each zone of a catalytic coating or any section of a coating, is present on the substrate at a loading (concentration) of for instance about 0.3 g/in$^3$ to about 4.5 g/in$^3$ based on the substrate. This refers to dry solids weight per volume of substrate, for example per volume of a honeycomb monolith. The amount of base metal, i.e. copper, is only a portion of the catalytic coating, which also includes the molecular sieve. An amount of copper per volume would for instance be about 0.2% to about 10% of the above values. An amount of copper per volume is the copper concentration. An amount of a copper-containing molecular sieve per volume is the molecular sieve concentration. Concentration is based on a cross-section of a substrate or on an entire substrate.

Catalytic Articles and Systems

The term "catalytic article" refers to an element that is used to promote a desired reaction. The present catalytic articles comprise a substrate having a catalytic coating disposed thereon.

A system contains more than one article, for instance, a first SCR article and a second SCR article. A system may also comprise one or more articles containing a reductant injector, a diesel oxidation catalyst (DOC), a soot filter, an ammonia oxidation catalyst (AMOx) or a lean NOx trap (LNT).

An article containing a reductant injector is a reduction article. A reduction system includes a reductant injector and/or a pump and/or a reservoir, etc.

The present treatment system may further comprise a diesel oxidation catalyst and/or a soot filter and/or an ammonia oxidation catalyst. A diesel particulate filter (DPF) may be uncatalyzed or may be catalyzed, thus creating a catalyzed soot filter (CSF). For instance, the present treatment system may comprise, from upstream to downstream—an article containing a DOC, a CSF, an urea injector, the present zoned SCR article or a first SCR article and a second SCR article and an article containing an AMOx.

An alternate system may contain a lean NOx trap (LNT) followed by a SCR catalyst coated on a particulate filter (SCRoF) and optionally a zoned SCR article containing an AMOx catalyst. In this system both the SCRoF and SCR articles may contain the present catalysts.

An undercoat layer comprising an AMOx catalyst may be present in a downstream zone of a substrate. For instance an AMOx undercoat layer may extend from the outlet end towards the inlet end about 10% to about 80% of the substrate length of a present article.

An AMOx layer may also be present on a second substrate of a second downstream article to provide a downstream AMOx article.

AMOx catalysts are taught for instance in U.S. Pub. No. 2011/0271664, the disclosure of which is incorporated herein by reference. An ammonia oxidation (AMOx) catalyst may be a supported precious metal component which is effective to remove ammonia from an exhaust gas stream. The precious metal may include ruthenium, rhodium, iridium, palladium, platinum, silver or gold. For example, the precious metal component includes physical mixtures or chemical or atomically-doped combinations of precious metals. The precious metal component for instance includes platinum. Platinum may be present in an amount of about 0.008% to about 2 wt. % based on the AMOx catalyst.

The precious metal component is typically deposited on a high surface area refractory metal oxide support. Examples of suitable high surface area refractory metal oxides include alumina, silica, titania, ceria, and zirconia, as well as physical mixtures, chemical combinations and/or atomically-doped combinations thereof. In specific embodiments, the refractory metal oxide may contain a mixed oxide such as silica-alumina, amorphous or crystalline aluminosilicates, alumina-zirconia, alumina-lanthana, alumina-manganesia, alumina-baria, alumina-ceria and the like. An exemplary refractory metal oxide comprises high surface area γ-alumina having a specific surface area of about 50 to about 300 $m^2/g$.

The AMOx catalyst may include a zeolitic or non-zeolitic molecular sieve for example selected from those of the AEI, CHA, FAU, BEA, MFI and MOR types. A molecular sieve may be physically mixed with an oxide-supported platinum component. In an alternative embodiment, platinum may be distributed on the external surface or in the channels, cavities or cages of the molecular sieve.

Present embodiments that include a first catalytic article and a second catalytic article may be referred to as a "multi-component" or "multi-brick" system. A "brick" may refer to a single article such as a monolith or filter.

Advantageously, articles of a multi-component system may each contain substrates containing zoned or layered coatings as disclosed herein.

The catalytic articles are effective to catalyze the reduction of nitrogen oxides (NOx) in the presence of a reductant, for example ammonia or urea. In operation, the reductant is periodically metered into the exhaust stream from a position upstream of the SCR article. The injector is in fluid communication with and upstream of the SCR article. The injector may also be associated with a reductant reservoir and a pump.

Present articles, systems and methods are suitable for treatment of exhaust gas streams from mobile emissions sources such as trucks and automobiles. Articles, systems and methods are also suitable for treatment of exhaust streams from stationary sources such as power plants.

Ammonia is a typical reductant for SCR reactions for treating exhaust of stationary power plants while urea is the typical SCR reducing agent used for treatment of exhaust of mobile emissions sources. Urea decomposes to ammonia and carbon dioxide prior to contact with or on the SCR catalyst, where ammonia serves as the reducing agent for NOx.

The articles, systems and methods described herein can provide high NOx conversion. The term "fresh" defines the state of the catalyst article immediately following preparation and the term "fresh catalyst activity" defines the catalyst performance in the "fresh" condition. The term "aged" defines the state of the catalyst article following hydrothermal aging for a defined period of time, and the term "aged catalyst activity" defines the catalyst performance in the "aged" condition. Catalyst performance can be defined in relation to a specific test temperature. For example, a present catalytic article may exhibit an aged $NO_x$ conversion at 200° C. of at least 50% and preferably at least 75% (e.g., about 50% to about 99%) measured at a gas hourly space velocity of 80000 $h^{-1}$. A present catalytic article may exhibit an aged $NO_x$ conversion at 450° C. of at least 70% and preferably at least 85% (e.g., about 70% to about 99% measured at a gas hourly volume-based space velocity of 80000 $h^{-1}$ under laboratory reactor steady state conditions in a gas mixture of 500 ppm NO, 500 ppm $NH_3$, 10% $O_2$, 5% $H_2O$, balance $N_2$. An aged catalyst meeting the above requirements may be subject to aging conditions such that, prior to evaluation, the catalysts are hydrothermally aged in a tube furnace in a gas flow containing 10% $H_2O$, 10% $O_2$, balance $N_2$ for 50 hours at 650° C., for 5 hours at 750° C. or for 16 h at 800° C. Such SCR activity measurements are demonstrated in U.S. Pat. No. 8,404,203.

SCR performances such as $NO_x$ conversion are for example measured at a gas hourly volume-based space velocity of 80000 $h^{-1}$ under pseudo-steady state conditions in a gas mixture of 500 ppm $NO_x$ (fast SCR condition: $NO_2/NO_x=0.5$ or standard SCR conditions: $NO_2/NO_x=0$), 500 ppm $NH_3$, 10% $O_2$, 5% $H_2O$, balance $N_2$ in a temperature ramp of 0.5° C./min from 200° C. to 600° C.

NOx conversion is defined as mol % conversion of NO and $NO_2$ combined. A high value is desired.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

In the present exhaust gas treatment methods, the exhaust gas stream is passed through the SCR article, SCR system or exhaust gas treatment system by entering the upstream end and exiting the downstream end.

Certain embodiments pertain to the use of articles, systems and methods for removing NOx from exhaust gases of internal combustion engines, in particular diesel engines, which operate at combustion conditions with air in excess of that required for stoichiometric combustion, i.e. lean conditions.

The term "vehicle" means for instance any vehicle having an internal combustion engine and includes for instance passenger automobiles, sport utility vehicles, minivans, vans, trucks, buses, refuse vehicles, freight trucks, construction vehicles, heavy equipment, military vehicles, farm vehicles and the like.

"Platinum group metal components" refer to platinum group metals or one of their oxides. "Rare earth metal components" refer to one or more oxides of the lanthanum series defined in the Periodic Table of Elements, including lanthanum, cerium, praseodymium and neodymium.

D90 particle size distribution indicates that 90% of the particles (by number) have a Feret diameter below a certain size as measured by Scanning Electron Microscopy (SEM) or Transmission Electron Microscopy (TEM) for submicron size particles; and a particle size analyzer for support-containing particles (micron size). Average (mean) particle size is synonymous with D50, meaning half of the population resides above this point, and half below. Particle size may be measured by laser light scattering techniques, with dispersions or dry powders, for example according to ASTM method D4464. A particle size analyzer measures the number distribution of individual particles as a function of size. Individual particles may be single crystallites or an agglomerate of smaller crystallites.

Identification of Aging Stable Catalytic Materials

As evident from the foregoing and from the appended Examples, the present disclosure can particularly relate to methods for identifying useful catalytic materials. The use of DRIFT spectroscopy in particular makes it possible to evaluate a plurality of samples of copper-containing molecular sieves and identify materials that would be expected to be useful as a catalytic material, and more particularly to identify materials that can exhibit aging stability.

A method for identification of catalytic materials can comprise first providing a plurality of samples that each comprise particles of a copper-containing molecular sieve containing ion-exchanged copper as $Cu^{+2}$ cations and as $Cu(OH)^{+1}$ cations. The copper-containing molecular sieve materials may have any configuration as otherwise described herein.

The various samples can be in particulate form or may be milled as necessary to provide the necessary form for subjecting the particles of the copper-containing molecular sieve to Diffuse Reflectance Infrared Fourier Transform (DRIFT) spectroscopy. DRIFT spectroscopy can be carried out so as to evaluate perturbed T-O-T vibrational peaks corresponding to the $Cu^{+2}$ cations in the copper-containing molecular sieve and perturbed T-O-T vibrational peaks corresponding to the $Cu(OH)^{+1}$ cations in the copper-containing molecular sieve. As otherwise described herein, such information can be used to identify the nature of the copper cations in the copper-containing molecular sieve. Moreover, such information can be directly related to the NOx conversion activity and the aging stability that would be expected in the copper-containing molecular sieve.

The present methods thus further can include selecting one or more of the samples whereby the DRIFT data indicates usefulness as otherwise discussed herein. For example, a useful sample can be identified wherein the copper-containing molecular sieve exhibits a ratio for an integrated peak area of the perturbed T-O-T vibrational peak corresponding to the $Cu^{+2}$ cations to a peak integration area of the perturbed T-O-T vibrational peak corresponding to the $Cu(OH)^{+1}$ cations that is ≥1.

The further characteristics that are also described herein as indicating usefulness may also be applied in the alternative or in any combination for identifying suitable samples for use in manufacturing catalytic compositions or catalytic articles. For example, as already described above, a percentage of the total integrated peak area that is attributable to the integrated peak area for the perturbed T-O-T asymmetric stretching vibrational peak corresponding to the $Cu^{+2}$ cations can be calculated by dividing the integrated peak area for the perturbed T-O-T asymmetric stretching vibrational peak corresponding to the $Cu^{+2}$ cations by a total peak integration area for the perturbed T-O-T bond vibrational peak corresponding to the $Cu^{+2}$ cations and the perturbed T-O-T asymmetric stretching vibrational peak corresponding to the $Cu(OH)^{+1}$ cations combined. With such knowledge, the present methods thus can include selecting one or more samples wherein the percentage of the total integrated peak area that is attributable to the perturbed T-O-T bond vibrational peak for $Cu^{+2}$ cations is ≥50%.

As desired, additional processing steps can be carried out to confirm aging stability of the useful samples. For example, the plurality of samples subjected to the DRIFT spectroscopy as discussed above can specifically be in a fresh state. As such, the method further can comprise aging the plurality of samples (e.g., at a temperature of about 800° C. for a time of about 16 hours in the presence of air with an $H_2O$ content of about 10 mol %) to form aged samples. Thereafter, the methods can comprise subjecting the aged samples to the DRIFT spectroscopy and selecting one or more of the samples, wherein the percentage of the total integrated peak area that is attributable to the perturbed T-O-T asymmetric stretching vibrational peak corresponding to the $Cu^{+2}$ cations for the copper-containing molecular sieve in an aged state is increased by ≤20% relative to the percentage of the total integrated peak area that is attributable to the perturbed T-O-T asymmetric stretching vibrational peak corresponding to the $Cu^{+2}$ cations for the copper-containing molecular sieve in the fresh state.

The foregoing methods thus make it possible to identify useful catalytic materials that can be expected to exhibit good NOx conversion activities and also be aging stable. As such, new catalytic materials can be identified more easily based upon spectroscopic analysis without the need for other detailed testing techniques.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

Unless otherwise indicated, all parts and percentages are by weight. Weight percent (wt. %), if not otherwise indicated, is based on an entire composition free of any volatiles, that is, based on dry solids content.

All U.S. patent applications, published patent applications, and patents referred to herein are hereby incorporated by reference.

Example 1 SCR Catalyst

Catalytic coatings containing CuCHA zeolite having a SAR of 17, 4.0 wt. % CuO and a Cu/Al ratio of 0.295 and zirconium oxide binder were disposed via a washcoat process on cellular ceramic monoliths having a cell density of 400 cpsi and a wall thickness of 6 mil. The coated monoliths were dried at 110° C. and calcined at about 550° C. for 1 hour. The coating process provided a catalyst loading of 2.1 g/in$^3$ of which 5% is zirconium oxide binder.

Example 2 SCR Catalyst

Catalytic coatings containing CuCHA zeolite having a SAR of 20, 3.8 wt. % CuO and a Cu/Al ratio of 0.325 and zirconium oxide binder were disposed via a washcoat process on cellular ceramic monoliths having a cell density of 400 cpsi and a wall thickness of 6 mil. The coated monoliths were dried at 110° C. and calcined at about 550° C. for 1 hour. The coating process provided a catalyst loading of 2.1 g/in$^3$ of which 5% is zirconium oxide binder.

Example 3 SCR Catalyst

Catalytic coatings containing CuCHA zeolite having a SAR of 25, 3.5 wt. % CuO and a Cu/Al ratio of 0.365 and zirconium oxide binder were disposed via a washcoat process on cellular ceramic monoliths having a cell density of 400 cpsi and a wall thickness of 6 mil. The coated monoliths were dried at 110° C. and calcined at about 550° C. for 1 hour. The coating process provided a catalyst loading of 2.1 g/in$^3$ of which 5% is zirconium oxide binder.

Example 4 NOx Conversion Testing for Catalytic Coatings from Examples 1-3

NO$_x$ conversions were measured in a laboratory reactor at a gas hourly volume-based space velocity of 80000 h$^{-1}$ under pseudo-steady state conditions in a gas mixture of 500 ppm NO, 500 ppm NH$_3$, 10% O$_2$, 5% H$_2$O, balance N$_2$ in a temperature ramp of 0.5° C./min from 200° C. to 600° C. NOx conversion is reported as mol % and measured as NO and NO$_2$.

Figure 5:
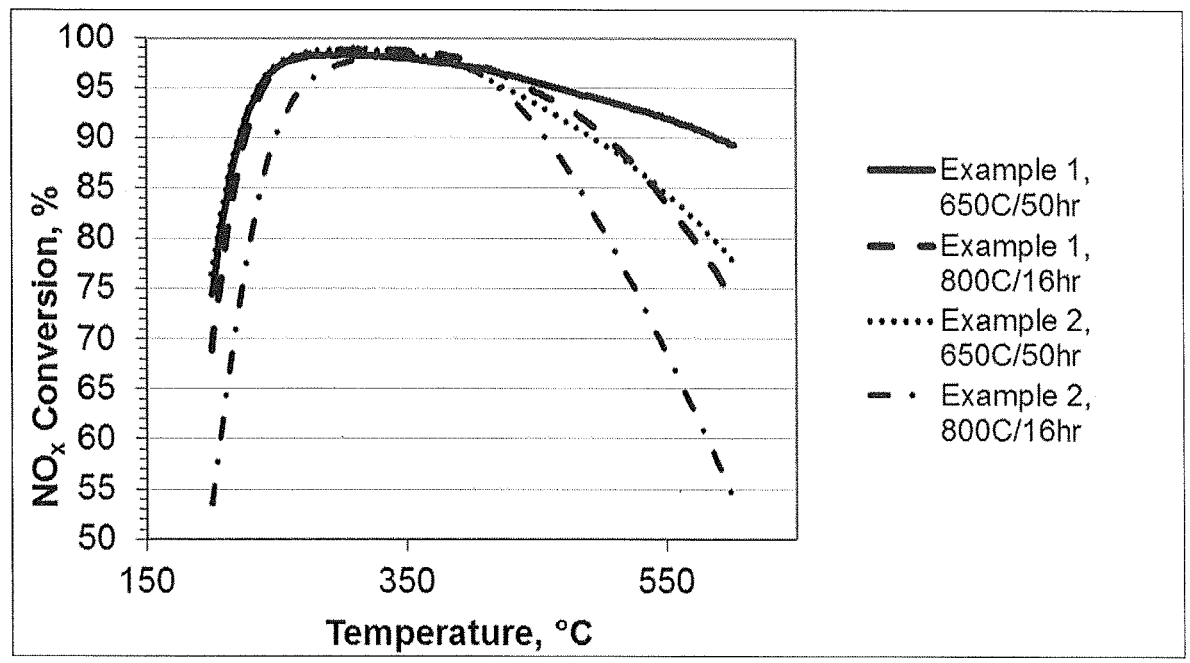
FIG. 5 is a graph showing NOx conversion of catalytic coating samples as described in Example 1 and Example 2.
Figure 6:
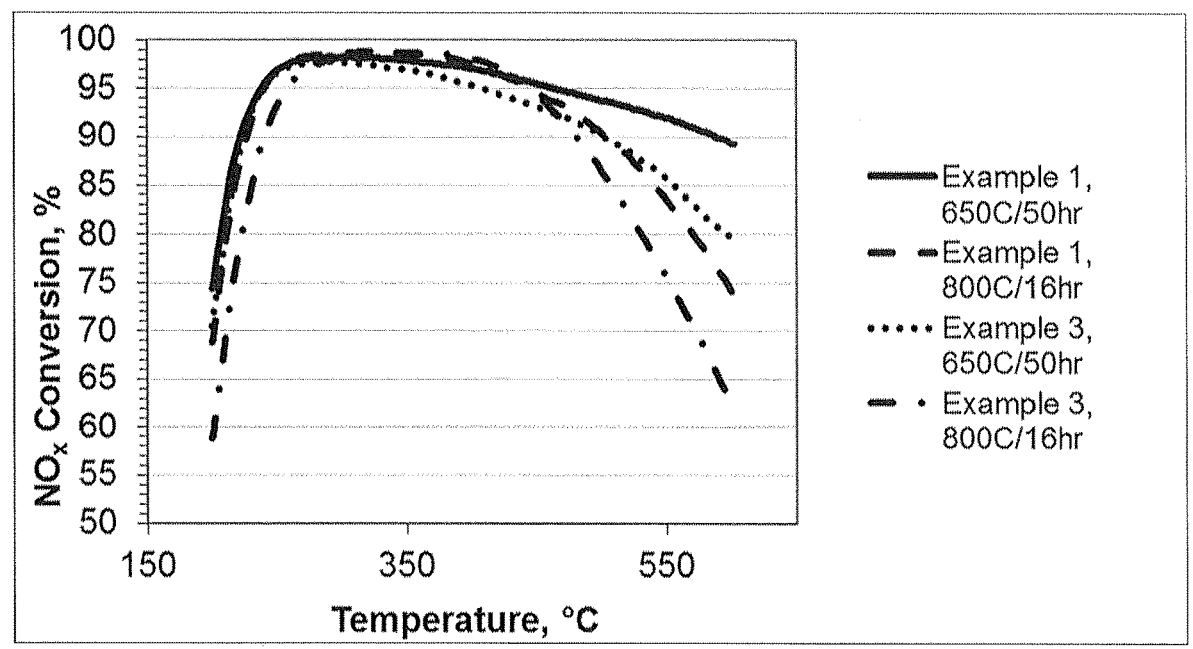
FIG. 6 is a graph showing NOx conversion of catalytic coating samples as described in Example 1 and Example 3.

The coated monoliths of Examples 1-3 were hydrothermally aged in the presence of 10% H$_2$/air at 800° C. for 16 hours. FIG. 5 shows NOx conversion of Example 1 relative to Example 2. FIG. 6 shows NOx conversion of Example 1 relative to Example 3. Example 1 was superior regarding NOx conversion under both aging conditions.

Example 5 DRIFT Spectroscopy for Catalytic Coatings from Examples 1-3

DRIFT measurements were performed on a THERMO NICOLET FT-IR instrument with a MCT (HgCdTe) detector and a Harrick environmental chamber with ZnSe windows. Samples were ground to a fine powder with mortar and pestle and placed into the sample cup. The powder was dehydrated at 400° C. for 1 hour in flowing Ar at 40 mL/min and cooled to 30° C. and the spectra was recorded using KBr as a reference. Copper species in zeolite were identified by monitoring the perturbed T-O-T bond (Si—O—Al and Si—O—Si) vibrations by infrared spectroscopy. The structural vibrations of T-O-T bonds in zeolite have absorption peaks at 1350-920 cm$^{-1}$ and 850-620 cm$^{-1}$ for asymmetric and symmetric vibration modes, respectively. The perturbed T-O-T bond vibrations are observed when copper ions are exchanged into cationic position of zeolite structures, due to strong interaction between copper ions and neighbouring oxygen atoms in the framework. The peak position depends on the status of charge compensated cations and the structure of the zeolite framework. The peak intensity depends on the quantity of charge compensated cations in the exchanged sites.

Figure 7:
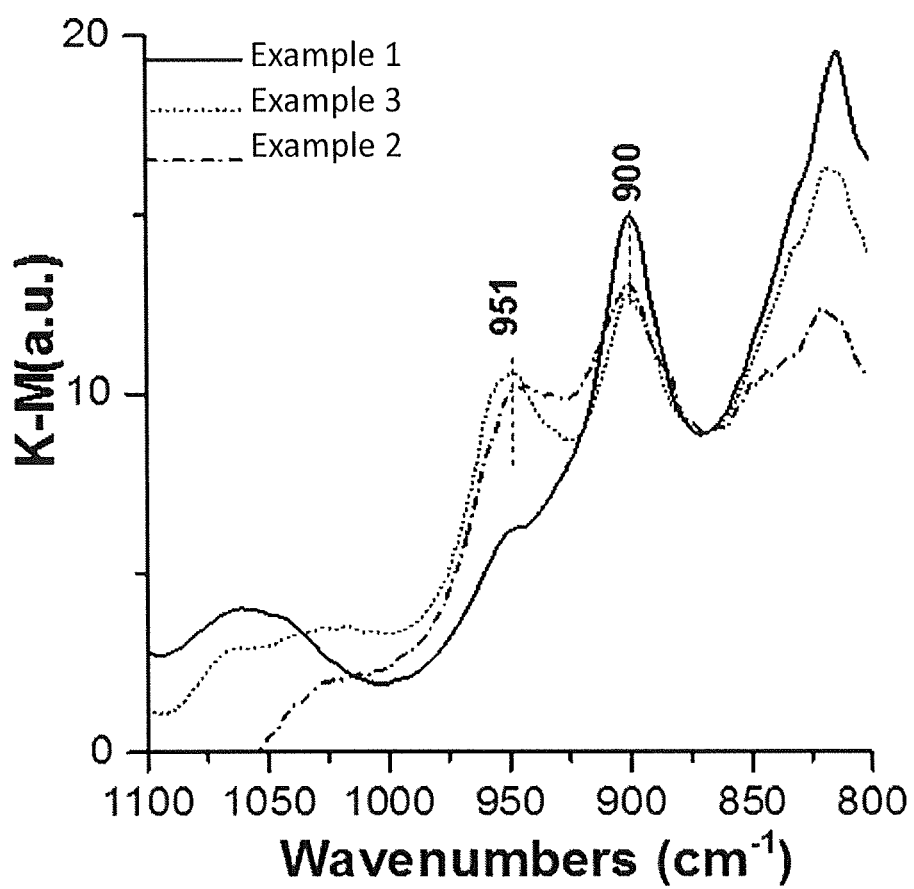
FIG. 7 illustrates the DRIFT spectra of catalytic coating samples as described in Examples 1 through 3 in the fresh state.

DRIFT spectra of the CuCHA samples of Examples 1, 2 and 3 in the fresh state are shown in FIG. 7. In addition to the asymmetric and symmetric vibrations of unperturbed T-O-T (Si—O—Al) bonds at ca. 1040 and 810 cm$^{-1}$, two new perturbed absorptions appeared at 900 and 950 cm$^{-1}$. The peak at 900 cm$^{-1}$ was attributed to perturbed T-O-T asymmetric stretching vibrations with Cu$^{2+}$ associated with an Al pair, and the peak at 950 cm$^{-1}$ was attributed to perturbed T-O-T asymmetric stretching vibrations with Cu(OH)$^+$ associated with a single Al. Peak fitting was carried out in Origin 9.1 software. The peaks were modeled as Gaussian peaks and peak fitting was performed until a chi-squared tolerance value of 1E-6 was reached. The peak areas associated with the 900 and 950 cm$^{-1}$ perturbed vibrational modes of the fresh samples are listed in Table 1. The perturbed T-O-T peak at 900 cm$^{-1}$ evidencing Cu$^{2+}$ ion associated with an Al pair has the greatest area, implying that Cu$^{+2}$ is the dominant copper species in Example 1, and the 900 cm$^{-1}$ peak area is 71% of the total peak areas including the sum of peak areas at 900 and 950 cm$^{-1}$. Examples 2 and 3 comprise a large quantity of Cu(OH)$^{+1}$ in addition to Cu$^{2+}$ (as evidenced by increased areas under the T-O-T peaks at 950 cm$^{-1}$) and the percentage of 900 cm$^{-1}$ peak area relative to the sum total of the peak areas including 900 and 950 cm$^{-1}$) was only 47% and 43%, respectively. Example 1 shows high NO$_x$ reduction activity and high hydrothermal stability; without being bound by theory, it is believed Cu$^{2+}$ ion balancing the charge of an Al pair is more stable than Cu(OH)$^{+1}$ balancing the charge of a single Al.

Figure 8:
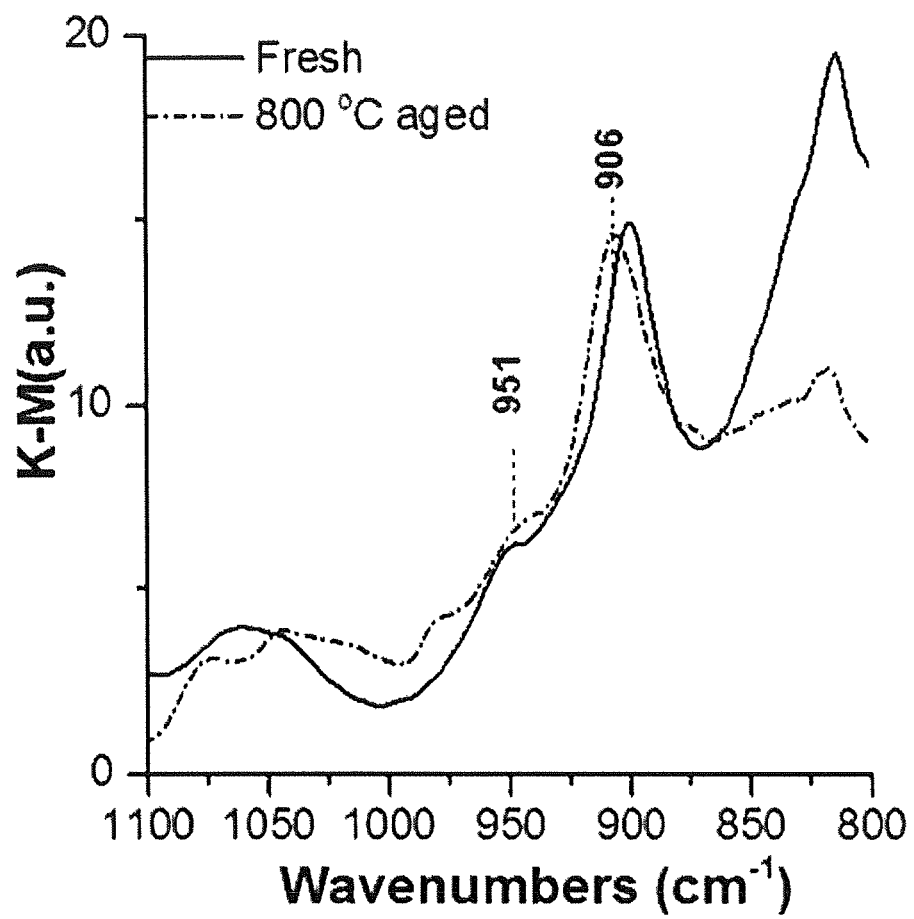
FIG. 8 illustrates the DRIFT spectra of catalytic coating samples as described in Example 1 in a fresh state and an aged state.
Figure 9:
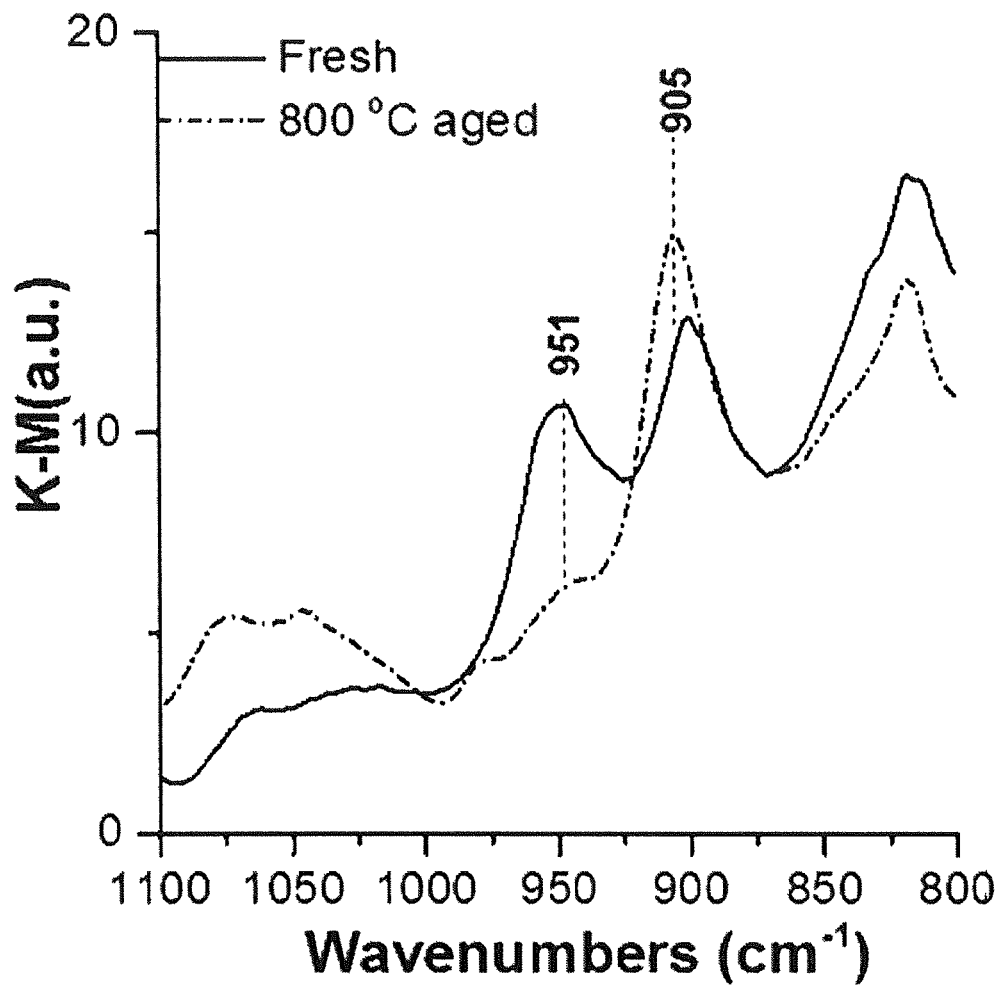
FIG. 9 illustrates the DRIFT spectra of catalytic coating samples as described in Example 3 in a fresh state and an aged state.

Hydrothermal aging at 800° C. did not alter the relative T-O-T peak areas at 900 and 950 cm$^{-1}$ for the copper-exchanged molecular sieve in Example 1 as shown in FIG. 8 and Table 2. This is evidence that the relative atomic percentages of Cu$^{+2}$ and Cu(OH)$^{+1}$ in the copper-exchanged molecular sieve in Example 1 likewise were unchanged by the aging, thus demonstrating the high hydrothermal stability of Example 1. In the case of Example 3, after 800° C. aging, the signal for the perturbed T-O-T peak evidencing the Cu(OH)$^{+1}$ (at 950 cm$^{-1}$) largely decreased and the signal for the perturbed T-O-T peak evidencing the Cu$^{2+}$ (at 900 cm$^{-1}$) increased (FIG. 9), resulting in the percentage of the 900 cm$^{-1}$ peak increasing from 43% to 76% (Table 3). The total peak area decreased from 382 to 320.

Without being bound by theory, it is important to note that it is not implied that the Cu(OH)$^{+1}$ species is transformed to Cu$^{+2}$, but only that the relative ratio of Cu$^{+2}$ to the sum total of Cu cation species, [Cu$^{+2}$+Cu(OH)$^{+1}$], is changing.

TABLE 1

| | IR peak fitting results of fresh samples | | | |
|---|---|---|---|---|
| | Peak area | | Total | % of |
| Example | ~950 cm$^{-1}$ | ~900 cm$^{-1}$ | peak area | A$_{900cm-1}$ |
| Example 1 | 103 | 255 | 358 | 71 |
| Example 2 | 222 | 194 | 416 | 47 |
| Example 3 | 216 | 166 | 382 | 43 |

TABLE 2

IR peak fitting results of Example 1 fresh and aged samples

| Example 1 | Peak area | | Total | % of |
| --- | --- | --- | --- | --- |
| | ~950 cm$^{-1}$ | ~900 cm$^{-1}$ | peak area | $A_{900cm-1}$ |
| Fresh | 103 | 255 | 358 | 71 |
| Aged at 800° C. | 93 | 270 | 363 | 74 |

TABLE 3

IR peak fitting results of Example 3 fresh and aged samples

| Example 3 | Peak area | | Total | % of |
| --- | --- | --- | --- | --- |
| | ~950 cm$^{-1}$ | ~900 cm$^{-1}$ | peak area | $A_{900cm-1}$ |
| Fresh | 216 | 166 | 382 | 43 |
| Aged at 800° C. | 78 | 242 | 320 | 76 |

It is seen that the % peak area of the 900 cm$^{-1}$ peak for the copper-exchanged molecular sieve in Example 1 (% of $A900_{cm-1}$) increases by only about 4% upon aging (3/71). The % peak area of the 900 cm$^{-1}$ peak for the copper-exchanged molecular sieve in Example 3 increased about 77% (33/43). Thus, the copper-exchanged molecular sieve of Example 1 showed the desired aging stability as well as the increased NOx conversion performance as discussed in Example 4.

Example 6 SCR Catalyst

Catalytic materials containing CuSAPO were prepared. Specifically, Cu exchange using 0.2 M copper acetate was carried on NH$_4$-SAPO-34 at 80° C. for 2 hours. The sample was filtered, washed with DI water and dried at 90° C. then calcined at 450° C. for 2 hours. The obtained CuSAPO-34 had a copper content of 3.3 wt. %, expressed as CuO. The CuSAPO material was evaluated to confirm that the stability may be achieved for various types of molecular sieves.

Example 7 NOx Conversion Testing

Figure 10:
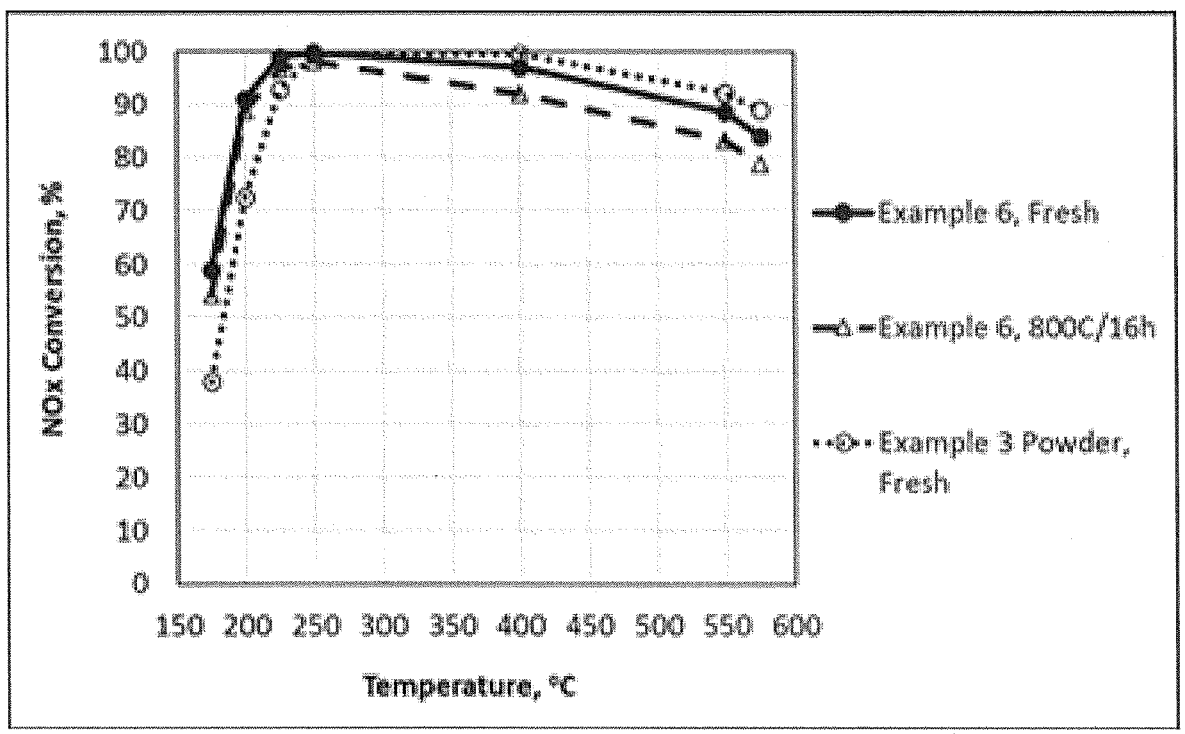
FIG. 10 is a graph showing NOx conversion of catalytic coating samples as described in Example 3 and Example 6.

NOx conversions were measured in a laboratory reactor at a gas hourly volume-based space velocity of 80000 h$^{-1}$ under steady state conditions in a gas mixture of 500 ppm NO, 500 ppm NH$_3$, 10% O$_2$, 5% H$_2$, balance N$_2$ in temperatures of 175, 200, 225, 250, 400, 550 and 575° C. NOx conversion was reported as mol % and measured as NO and NO$_2$. The CuSAPO from Example 6 and the CuCHA from Example 3 were hydrothermally aged in the presence of 10% H$_2$O/air at 800° C. for 16 hours. FIG. 10 shows NOx conversion of Example 6 relative to Example 3. Example 6 shows high NOx conversion in the fresh state and after aging.

Example 8 DRIFT Spectroscopy for Example 6

Figure 11:
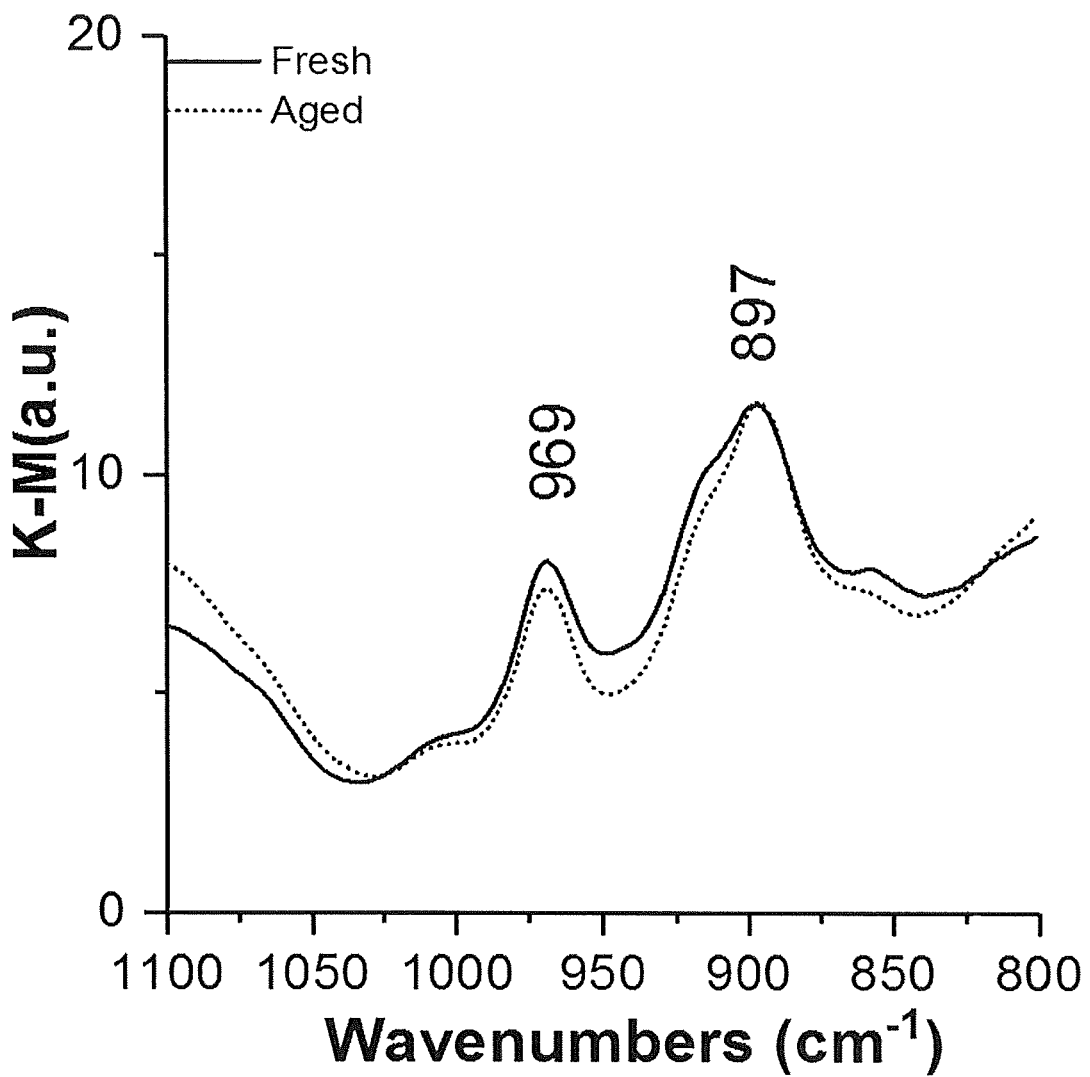
FIG. 11 illustrates the DRIFT spectra of catalytic coating samples as described in Example 6 in a fresh state and an aged state.

DRIFT measurements were performed as described in Example 5. The DRIFT spectrum of the sample from Example 6 is shown in FIG. 11. Perturbed T-O-T bonds at ca. 900 and 970 cm$^{-1}$ are attributed to the asymmetric stretching vibration of the T-O-T bond with Cu$^{2+}$ associated with a Si pair and the asymmetric stretching vibration of the T-O-T bond with Cu(OH)$^+$ associated with a single Si, respectively. Peak fitting was again carried out in Origin 9.1 software. In the peak fitting, the peaks were modeled as Gaussian peaks and peak fitting was performed until a chi-squared tolerance value of 1E-6 was reached. As can be seen in FIG. 11, the perturbed T-O-T peak at 900 cm$^{-1}$ evidencing Cu$^{2+}$ ion associated with a Si pair has the greatest area implying that Cu$^{+2}$ was the dominant copper species in Example 6.

Hydrothermal aging at 800° C. did not alter the relative T-O-T peak areas at 900 and 970 cm$^{-1}$ for the copper-exchanged SAPO-34 molecular sieve in Example 6. This is evidence that the relative atomic percentages of Cu$^{+2}$ and Cu(OH)$^{+1}$ in the copper-exchanged SAPO-34 molecular sieve in Example 6 likewise are unchanged by the aging, thus demonstrating the high hydrothermal stability of Example 6.

Hydrothermal aging at 800° C. does not alter the quantity of Cu$^{2+}$ and Cu(OH)$^+$ in Example 6 as shown in FIG. 11 and Table 4, demonstrating the high hydrothermal stability of Example 6. It is seen that the % peak area of the 900 cm$^{-1}$ peak for inventive Example 1 and Example 6 (% of $A900_{cm-1}$) increases by only about 4% upon aging (3/71 for Example 1 and 3/73 for Example 6). The % peak area of the 900 cm$^{-1}$ peak for comparative Example 3 increases about 77% (33/43).

TABLE 4

IR peak fitting results of Example 6 fresh and aged samples

| Example 6 | Peak area | | Total | % of |
| --- | --- | --- | --- | --- |
| | ~970 cm$^{-1}$ | ~900 cm$^{-1}$ | peak area | $A_{900cm-1}$ |
| Fresh | 62 | 164 | 226 | 73 |
| Aged at 800° C. | 59 | 192 | 251 | 76 |

The invention claimed is:

1. A selective catalytic reduction article comprising a substrate having a catalytic coating on at least a portion of a surface thereof, the catalytic coating including a copper-containing molecular sieve in a fresh state containing ion-exchanged copper as Cu$^{+2}$ cations and as Cu(OH)$^{+1}$ cations wherein the copper-containing molecular sieve exhibits a perturbed T-O-T asymmetric stretching vibrational peak corresponding to the Cu$^{+2}$ cations and a perturbed T-O-T asymmetric stretching vibrational peak corresponding to the Cu(OH)$^{+1}$ cations, and wherein the ratio of the integrated peak area of the perturbed T-O-T asymmetric stretching vibrational peak corresponding to the Cu$^{+2}$ cations to the integrated peak area of the perturbed T-O-T asymmetric stretching vibrational peak corresponding to the Cu(OH)$^{+1}$ cations is ≥1 as measured using Diffuse Reflectance Infrared Fourier Transform (DRIFT) spectroscopy;

wherein a percentage of the total integrated peak area that is attributable to the perturbed T-O-T asymmetric stretching vibrational peak corresponding to the Cu$^{+2}$ cations is calculated by dividing the integrated peak area for the perturbed T-O-T asymmetric stretching vibrational peak corresponding to the Cu$^{+2}$ cations by the integrated peak areas for the perturbed T-O-T asymmetric stretching vibrational peaks corresponding to the Cu$^{+2}$ cations and Cu(OH)$^{+1}$ cations combined, and wherein the percentage of the total integrated peak area that is attributable to the perturbed T-O-T asymmetric stretching vibrational peak for Cu$^{+2}$ cations is ≥50%; and wherein the contribution by the perturbed T-O-T asymmetric stretching vibrational peak corresponding to the $Cu^{+2}$ cations to the combined integrated peak areas for the perturbed T-O-T asymmetric stretching vibrational peaks of the $Cu^{+2}$ cations and $Cu(OH)^{+1}$ cations for the copper-containing molecular sieve in an aged state is increased by ≤20% relative to the contribution for the copper-containing molecular sieve in the fresh state, wherein the aged state is defined by having aged the selective catalytic reduction article at a temperature of about 800° C. for a time of about 16 hours in the presence of air with an $H_2O$ content of about 10 mol. %.

2. The selective catalytic reduction article of claim 1, wherein the copper-containing molecular sieve exhibits the perturbed T-O-T asymmetric stretching vibrational peaks corresponding to the $Cu^{+2}$ cations and the $Cu(OH)^{+1}$ cations at about 900 $cm^{-1}$ and about 950 $cm^{-1}$, respectively, in the infrared spectrum, or wherein the copper-containing molecular sieve exhibits perturbed T-O-T asymmetric stretching vibrational peaks corresponding to the $Cu^{+2}$ cations and the $Cu(OH)^{+1}$ cations at about 900 $cm^{-1}$ and about 970 $cm^{-1}$, respectively, in the infrared spectrum.

3. The selective catalytic reduction article of claim 1, wherein the total amount of copper in the copper-containing molecular sieve, calculated as copper oxide, is about 1.0 wt. % to about 10 wt. %, based on the total weight of the copper-containing molecular sieve.

4. The selective catalytic reduction article of claim 1, wherein the copper-containing molecular sieve comprises crystals or agglomerates having a mean size ≤2.0 microns.

5. The selective catalytic reduction article of claim 1, wherein the copper-containing molecular sieve comprises a small pore molecular sieve selected from the framework types AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, mixtures thereof, and intergrowths thereof.

6. The selective catalytic reduction article of claim 1, wherein the molecular sieve comprises a medium pore molecular sieve selected from the framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, mixtures thereof, and intergrowths thereof.

7. The selective catalytic reduction article of claim 1, wherein the molecular sieve comprises a large pore molecular sieve selected from the framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IVW, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, mixtures thereof, and intergrowths thereof.

8. The selective catalytic reduction article of claim 1, wherein the molecular sieve is selected from aluminosilicate zeolites, borosilicates, gallosilicates, SAPOs, AlPOs, MeAPSOs, MeAPOs, and combinations thereof.

9. The selective catalytic reduction article of claim 1, wherein the molecular sieve has CHA cages and double-six ring building units and is selected from Cu-CHA, Cu-SAPO-34, AEI, Cu-SAPO-18, and combinations thereof.

10. The selective catalytic reduction article of claim 1, wherein the selective catalytic reduction article further comprises one or more catalytically active metals selected from manganese, iron, cobalt, nickel, cerium, platinum, palladium and rhodium; or containing one or more base metals selected from sodium, potassium, magnesium, calcium, strontium, barium, and combinations thereof.

11. The selective catalytic reduction article of claim 1, wherein the catalytic coating comprises:
a first catalytic coating comprising the copper-containing molecular sieve; and
a second catalytic coating that is different from the first catalytic coating.

12. The selective catalytic reduction article of claim 11, wherein the second catalytic coating comprises a copper-containing molecular sieve that is different from the copper-containing molecular sieve in the first coating.

13. The selective catalytic reduction article of claim 11, wherein the second catalytic coating comprises a platinum group metal on a refractory metal oxide support.

14. The selective catalytic reduction article of claim 13, wherein the platinum group metal is present in an amount of about 0.5 $g/ft^3$ to about 30 $g/ft^3$, based on the total volume of the substrate.

15. The selective catalytic reduction article of claim 11, wherein the catalytic coating including the copper-containing molecular sieve is present in an amount of about 0.1 $g/in^3$ to about 4.5 $g/in^3$, based on the total volume of the substrate.

16. The selective catalytic reduction article of claim 11, wherein the first catalytic coating and the second catalytic coating are present in separate layers or are present as separate zones in the same layer.

17. The selective catalytic reduction article of claim 1, wherein the substrate is a porous wall-flow filter or a flow-through monolith.

18. An exhaust gas treatment system comprising:
the selective catalytic reduction article according to claim 1; and
a reductant injector in fluid communication with and upstream of the selective catalytic reduction article.

19. The exhaust gas treatment system of claim 18, further comprising one or more of a diesel oxidation catalyst, a soot filter, a lean NOx trap (LNT), and an ammonia oxidation catalyst.

20. A method for treating an exhaust stream containing NOx, comprising passing the exhaust stream through a selective catalytic reduction article of claim 1.

21. A method for identifying the catalytic coating that is stable toward aging for the selective catalytic reduction article of claim 1, the method comprising:
providing a plurality of samples that each comprise particles of the copper-containing molecular sieve in the fresh state containing ion-exchanged copper as $Cu^{+2}$ cations and as $Cu(OH)^{+1}$ cations;
subjecting the particles of the copper-containing molecular sieve in a fresh state to Diffuse Reflectance Infrared Fourier Transform (DRIFT) spectroscopy so as to evaluate perturbed T-O-T asymmetric stretching vibrational peaks corresponding to the $Cu^{+2}$ cations in the copper-containing molecular sieve and perturbed T-O-T asymmetric stretching vibrational peaks corresponding to the $Cu(OH)^{+1}$ cations in the copper-containing molecular sieve; and
selecting one or more of the samples wherein the copper-containing molecular sieve in a fresh state exhibits a ratio for an integrated peak area of the perturbed T-O-T asymmetric stretching vibrational peak corresponding to the $Cu^{+2}$ cations to an integrated peak area of the perturbed T-O-T asymmetric stretching vibrational peak corresponding to the $Cu(OH)^{+1}$ cations that is ≥1.

22. The method of claim 21, wherein the method comprises selecting one or more samples wherein the percentage of the total peak integration area that is attributable to the perturbed T-O-T asymmetric stretching vibrational peak for $Cu^{+2}$ cations is ≥50%.

23. The method of claim 22, further comprising:

aging the plurality of samples at a temperature of about 800° C. for a time of about 16 hours in the presence of air with an $H_2O$ content of about 10 mol % to form aged samples;

subjecting the aged samples to the DRIFT spectroscopy; and selecting one or more of the samples wherein the contribution to the total integrated peak area by the perturbed T-O-T asymmetric stretching vibrational peak corresponding to the $Cu^{+2}$ cations for the one or more samples in an aged state is increased by ≤20% relative to the contribution to the total integrated peak area by the perturbed T-O-T asymmetric stretching vibrational peak corresponding to the $Cu^{+2}$ cations for the one or more samples in the fresh state.

* * * * *